(12) United States Patent
Jia et al.

(10) Patent No.: US 12,474,609 B2
(45) Date of Patent: Nov. 18, 2025

(54) DISPLAY MODULE AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Yuan Jia, Beijing (CN); Jingrui Ren, Beijing (CN)

(73) Assignees: Beijing BOE Display Technology Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/688,327

(22) PCT Filed: Aug. 5, 2022

(86) PCT No.: PCT/CN2022/110481
§ 371 (c)(1),
(2) Date: Feb. 29, 2024

(87) PCT Pub. No.: WO2023/029879
PCT Pub. Date: Mar. 9, 2023

(65) Prior Publication Data
US 2025/0130461 A1 Apr. 24, 2025

(30) Foreign Application Priority Data
Aug. 31, 2021 (CN) .......................... 202111016285.4

(51) Int. Cl.
*F21V 8/00* (2006.01)
*G02F 1/1335* (2006.01)
*G02F 1/13357* (2006.01)

(52) U.S. Cl.
CPC ....... *G02F 1/133614* (2021.01); *G02B 6/005* (2013.01); *G02F 1/133615* (2013.01); *G02F 1/133621* (2013.01)

(58) Field of Classification Search
CPC ......... G02F 1/133614; G02F 1/133615; G02F 1/133621; G02B 6/005
See application file for complete search history.

(56) References Cited

U.S. PATENT DOCUMENTS

2010/0177498 A1* 7/2010 Choi .................... G02F 1/13452
362/257
2012/0113677 A1* 5/2012 Huang ................. G02B 6/0043
362/606

(Continued)

FOREIGN PATENT DOCUMENTS

| CN | 105306349 A | 2/2016 |
|----|-------------|--------|
| CN | 106526963 A | 3/2017 |

(Continued)

OTHER PUBLICATIONS

English Machine Translation of WO 2013 042 705 (Year: 2025).*
European Patent Office, Extended European Search Report Issued in Application No. 22863020.8, Sep. 16, 2024, Germany, 9 pages.

*Primary Examiner* — Donald L Raleigh
(74) *Attorney, Agent, or Firm* — McCoy Russell LLP

(57) ABSTRACT

The present disclosure provides a display module and a display device. In the display module, light emitted by a light source passes through a color conversion film layer and an optical material layer into a display panel; the optical material layer is fixed on a film-fixed side; compensation structure includes a middle region and a peripheral region surrounding the middle region at a side facing the color conversion film layer, an orthogonal projection of the middle region onto a plane where a light-exiting surface of the display panel is located coincides with a display region of (Continued)

the display panel, an orthogonal projection of the peripheral region onto the plane at least partially overlaps with a non-display region of the display panel, the peripheral region is provided with a fluorescent material layer; and at least a part of the fluorescent material layer extends to the middle region.

16 Claims, 4 Drawing Sheets

(56) References Cited

U.S. PATENT DOCUMENTS

| | | | |
|---|---|---|---|
| 2016/0103267 A1 | 4/2016 | An et al. | |
| 2016/0209578 A1* | 7/2016 | Cho | G02B 6/005 |
| 2020/0158937 A1* | 5/2020 | Chang | G02B 6/0088 |

FOREIGN PATENT DOCUMENTS

| | | | | |
|---|---|---|---|---|
| CN | 107065305 A | 8/2017 | | |
| CN | 107203064 A | 9/2017 | | |
| CN | 107407832 A | 11/2017 | | |
| CN | 110721428 A | 1/2020 | | |
| CN | 212060820 U | 12/2020 | | |
| CN | 213399128 U | 6/2021 | | |
| CN | 216792630 U | 6/2022 | | |
| WO | WO-2013042705 A1 * | 3/2013 | | G02F 1/1334 |

* cited by examiner

DISPLAY MODULE AND DISPLAY DEVICE

CROSS REFERENCE TO RELATED APPLICATION

This application is the U.S. national phase of PCT Application No. PCT/CN2022/110481 filed on Aug. 5, 2022, and claims a priority of the Chinese patent application No. 202111016285.4 filed on Aug. 31, 2021, which is incorporated herein by reference in its entirety.

TECHNICAL FIELD

The present disclosure relates to the field of display technology, in particular to a display module and a display device.

BACKGROUND

Liquid Crystal Display (LCD) modules have been widely used in various fields due to such advantages as low manufacture cost and high resolution. In some high-end fields, an LCD module usually includes color conversion film layer architecture to meet the requirement of the LCD module on high color gamut. However, when the color conversion film layer architecture is used, light in a color approaching to a color of a light source occurs around the LCD module, resulting in a display defect around the LCD module.

SUMMARY

An object of the present disclosure is to provide a display module and a display device so as to solve the above-mentioned problem.

The present disclosure provides the following technical solutions.

In one aspect, the present disclosure provides in some embodiments a display module, including a film-fixed side and a non-film-fixed side, and further including a light source, and a compensation structure, a color conversion film layer, an optical material layer and a display panel laminated one on another. Light emitted by the light source passes through the color conversion film layer and the optical material layer into the display panel; the optical material layer is fixed on the film-fixed side; and the compensation structure includes a middle region and a peripheral region surrounding the middle region at a side facing the color conversion film layer, an orthogonal projection of the middle region onto a plane where a light-exiting surface of the display panel is located coincides with a display region of the display panel, an orthogonal projection of the peripheral region onto the plane where the light-exiting surface of the display panel is located at least partially overlaps with a non-display region of the display panel, the peripheral region is provided with a fluorescent material layer for absorbing light emitted by the light source and generating target light, at least a part of the fluorescent material layer extends to the middle region, and in a direction parallel to the display panel, a minimum width of the fluorescent material layer at the film-fixed side in a direction perpendicular to a boundary of the middle region adjacent to the fluorescent material layer is less than a minimum width of the fluorescent material layer at the non-film-fixed side in a direction perpendicular to the boundary of the middle region adjacent to the fluorescent material layer.

In a possible embodiment of the present disclosure, the light source includes a light guide plate and a lamp strip, the light guide plate includes a first surface and a second surface arranged opposite to each other and a lateral surface arranged between the first surface and the second surface, the lamp strip is arranged at the lateral surface of the light guide plate, and light emitted by the lamp strip enters the light guide plate from the lateral surface of the light guide plate; the color conversion film layer is arranged at the first surface of the light guide plate, and the optical material layer is arranged at a side of the color conversion film layer away from the light guide plate; and the compensation structure includes a reflection sheet arranged at the second surface of the light guide plate, and a peripheral region of the reflection sheet is provided with the fluorescent material layer.

In a possible embodiment of the present disclosure, the light source includes a lamp plate, the lamp plate is arranged at a side of the color conversion film layer away from the optical material layer, and the lamp plate is reused as the compensation structure.

In a possible embodiment of the present disclosure, the fluorescent material layer includes a mixed material layer of ink and fluorescent powder, and a mass percentage of the ink to the fluorescent powder ranges from 100/40.5 to 100/24.5.

In a possible embodiment of the present disclosure, the mass percentage of the ink to the fluorescent powder ranges from 100/25.5 to 100/24.5.

In a possible embodiment of the present disclosure, a thickness of the fluorescent material layer in a direction perpendicular to the color conversion film layer ranges from 5 μm to 6 μm.

In a possible embodiment of the present disclosure, the fluorescent material layer includes a fixed-side portion arranged at the film-fixed side and merely arranged in the peripheral region.

In a possible embodiment of the present disclosure, the fluorescent material layer includes a non-fixed-side portion arranged at the non-film-fixed side and arranged in both the peripheral region and the middle region.

In a possible embodiment of the present disclosure, the display region is of a rectangular shape, and a contour of each of the first surface and the second surface of the light guide plate is of a rectangular shape; the light guide plate includes a first lateral surface, a second lateral surface, a third lateral surface and a fourth lateral surface connected in an end-to-end manner, the first lateral surface is arranged at the film-fixed side, and the second lateral surface, the third lateral surface and the fourth lateral surface are arranged at the non-film-fixed side; and the non-fixed-side portion includes a second portion, a third portion and a fourth portion, the second portion is arranged close to the second lateral surface, the third portion is arranged close to the third lateral surface, and the fourth portion is arranged close to the fourth lateral surface.

In a possible embodiment of the present disclosure, the display region is of a rectangular shape other than a square shape, the display region includes a long boundary and a short boundary, the film-fixed side is arranged at a same side as the long boundary, and in the middle region, a minimum width of the second portion is greater than a minimum width of the third portion and a minimum width of the fourth portion is greater than a minimum width of the third portion.

In a possible embodiment of the present disclosure, a layout density of the fluorescent material layer decreases gradually in a direction from the peripheral region to the middle region.

In a possible embodiment of the present disclosure, the fixed-side portion includes a first layout region and a second layout region; a layout density m1 of the fixed-side portion in the first layout region is greater than or equal to 80%, and a layout density m2 of the fixed-side portion in the second layout region is greater than or equal to 30% and less than or equal to 50%; and a boundary of the second layout region close to the middle region coincides with the boundary of the middle region, the second layout region is arranged between the middle region and the first layout region, and a boundary of the second layout region away from the middle region coincides with a boundary of the first layout region close to the middle region.

In a possible embodiment of the present disclosure, the third portion includes a third layout region, a fourth layout region and a fifth layout region arranged in sequence; a layout density m3 of the third portion in the third layout region is greater than or equal to 80%, a layout density m4 of the third portion in the fourth layout region is greater than or equal to 30% and less than or equal to 50%, and a layout density m5 of the third portion in the fifth layout region is greater than or equal to 15% and less than or equal to 25%; a minimum distance d1 between an orthogonal projection of a boundary of the third layout region away from the middle region onto the light guide plate and a light guide boundary of the light guide plate arranged at a same side as the third layout region is less than or equal to 1.5 mm; a minimum distance d2 between an orthogonal projection of a boundary of the fourth layout region away from the middle region onto the light guide plate and the light guide boundary is greater than 1.5 mm and less than or equal to 5 mm; and a minimum distance d3 between an orthogonal projection of a boundary of the fifth layout region away from the middle region onto the light guide plate and the light guide boundary is greater than 5 mm and less than or equal to 9 mm.

In a possible embodiment of the present disclosure, the second portion includes a sixth layout region, a seventh layout region, an eighth layout region and a ninth layout region arranged in sequence; a layout density m6 of the second portion in the sixth layout region is greater than or equal to 80%, a layout density m7 of the second portion in the seventh layout region is greater than or equal to 30% and less than or equal to 50%, a layout density m8 of the second portion in the eighth layout region is greater than or equal to 15% and less than or equal to 25%, and a layout density m9 of the second portion in the ninth layout region is greater than or equal to 5% and less than or equal to 15%; a minimum distance d4 between an orthogonal projection of a boundary of the sixth layout region away from the middle region onto the light guide plate and a light guide boundary of the light guide plate arranged at a same side as the sixth layout region is less than or equal to 1.5 mm; a minimum distance d5 between an orthogonal projection of a boundary of the seventh layout region away from the middle region onto the light guide plate and the light guide boundary is greater than 1.5 mm and less than or equal to 5 mm; a minimum distance d6 between an orthogonal projection of a boundary of the eighth layout region away from the middle region onto the light guide plate and the light guide boundary is greater than 5 mm and less than or equal to 9 mm; a minimum distance d7 between an orthogonal projection of a boundary of the ninth layout region away from the middle region onto the light guide plate and the light guide boundary is greater than 9 mm and less than or equal to 11 mm; and a layout of the fourth portion is the same as the second portion.

In a possible embodiment of the present disclosure, the display module further includes a middle frame arranged at least around the non-film-fixed side; the middle frame covers a part of an edge of the light guide plate; and the color conversion film layer includes an invalid portion, and at the non-film-fixed side, an orthogonal projection of the invalid portion onto the light guide plate is arranged within an orthogonal projection of the middle frame onto the light guide plate.

In a possible embodiment of the present disclosure, a minimum width of the invalid portion in a direction parallel to the light guide plate is between 1 mm and 1.5 mm.

In a possible embodiment of the present disclosure, the optical material layer includes a prism layer and a brightness enhancement film, and the prism layer is arranged between the color conversion film layer and the brightness enhancement film; and at the non-film-fixed side, an orthogonal projection of the prism layer onto the color conversion film layer and/or an orthogonal projection of the brightness enhancement film onto the color conversion film layer do not overlap the invalid portion.

In a possible embodiment of the present disclosure, the display module further includes a middle frame, the middle frame includes a first portion arranged at the lateral surface of the light guide plate and a second portion covering at least a part of an edge of the first surface; a width X of a target portion in the fluorescent material layer satisfies X=X1+X2+X3, X1 satisfies $$\frac{X1}{Y} = \frac{d1}{d2},$$

Y is a distance between the display panel and the color conversion film layer in a direction perpendicular to the display panel, d1 is a width of a boundary of the color conversion film layer beyond a boundary of the prism layer at a side where the target portion is located, d2 is an overall thickness of the optical material layer in the direction perpendicular to the display panel, X2 satisfies:

$$\frac{L}{5200} \times 6,$$

L is actually measured brightness of structures in the display module other than the display panel at the side where the target portion is located, X3 is a maximum width of the middle frame at the side where the target portion is located, in a direction parallel to a reflection surface of the reflection sheet and in a direction perpendicular to the boundary of the middle region at the side where the target portion is located; and the target portion includes any one of the fixed-side portion, the second portion, the third portion and the fourth portion.

In a possible embodiment of the present disclosure, in the direction parallel to the reflection surface of the reflection sheet, the maximum width of the middle frame is less than or equal to 8 mm in the direction perpendicular to the boundary of the middle region at the side where the target portion is located.

In a possible embodiment of the present disclosure, the light guide plate is provided with a target boundary at a side where the at least a part of the edge is located, and a width of the at least a part of the edge is less than or equal to 10 mm in a direction parallel to the light guide plate and perpendicular to the target boundary.

In a possible embodiment of the present disclosure, in the middle region, the minimum width of the third portion is less than or equal to 4 mm, and the minimum width of the second portion and/or the minimum width of the fourth portion are less than or equal to 9 mm.

In a possible embodiment of the present disclosure, the lamp strip is arranged at the film-fixed side.

In a possible embodiment of the present disclosure, the lamp strip includes a lamp strip for emitting blue light, the fluorescent material layer includes a yellow fluorescent material layer, and the color conversion film layer includes a red/green quantum dot film.

In another aspect, the present disclosure provides in some embodiments a display module, including a non-film-fixed side, a light source, and a compensation structure, a color conversion film layer, an optical material layer and a display panel laminated one on another. Light emitted by the light source passes through the color conversion film layer and the optical material layer into the display panel; and the compensation structure includes a middle region and a peripheral region surrounding the middle region at a side facing the color conversion film layer, an orthogonal projection of the middle region onto a plane where a light-exiting surface of the display panel is located coincides with a display region of the display panel, an orthogonal projection of the peripheral region onto the plane where the light-exiting surface of the display panel is located at least partially overlaps with a non-display region of the display panel, the peripheral region is provided with a fluorescent material layer for absorbing light emitted by the light source and generating target light; at least a part of the fluorescent material layer extends to the middle region; and at the non-film-fixed side, a first distance is provided between an orthogonal projection of a boundary of the optical material layer onto a plane where the display panel is located and an orthogonal projection of a boundary of the display region close to the boundary of the optical material layer onto the plane; in a direction parallel to the plane, the fluorescent material layer is provided with a first width in a direction perpendicular to a boundary of the middle region adjacent to the fluorescent material layer; and the first width is negatively correlated with the first distance.

In a possible embodiment of the present disclosure, the first width is inversely proportional to the first distance.

In a possible embodiment of the present disclosure, the display module further includes a film-fixed side, and the optical material layer is fixed on the film-fixed side; and in a direction parallel to the display panel, a minimum width of the fluorescent material layer at the film-fixed side in a direction perpendicular to the boundary of the middle region adjacent to the fluorescent material layer is less than a minimum width of the fluorescent material layer at the non-film-fixed side in a direction perpendicular to the boundary of the middle region adjacent to the fluorescent material layer.

In a possible embodiment of the present disclosure, the light source includes a light guide plate and a lamp strip, the light guide plate includes a first surface and a second surface arranged opposite to each other and a lateral surface arranged between the first surface and the second surface; the lamp strip is arranged at the lateral surface of the light guide plate, and light emitted by the lamp strip enters the light guide plate from the lateral surface of the light guide plate; the color conversion film layer is arranged at the first surface of the light guide plate, and the optical material layer is arranged at a side of the color conversion film layer away from the light guide plate; and the compensation structure includes a reflection sheet arranged at the second surface of the light guide plate, and the peripheral region of the reflection sheet is provided with the fluorescent material layer.

In a possible embodiment of the present disclosure, the light source includes a lamp plate, the lamp plate is arranged at a side of the color conversion film layer away from the optical material layer, and the lamp plate is reused as the compensation structure.

In a possible embodiment of the present disclosure, the fluorescent material layer includes a mixed material layer of ink and fluorescent powder, and a mass percentage of the ink to the fluorescent powder ranges from 100/40.5 to 100/24.5.

In a possible embodiment of the present disclosure, a thickness of the fluorescent material layer in a direction perpendicular to the color conversion film layer ranges from 5 μm to 6 μm.

In a possible embodiment of the present disclosure, the display module further includes a film-fixed side, and the optical material layer is fixed on the film-fixed side; and the fluorescent material layer includes a fixed-side portion arranged at the film-fixed side and merely arranged in the peripheral region.

In a possible embodiment of the present disclosure, the fluorescent material layer includes a non-fixed-side portion arranged at the non-film-fixed side and arranged in both the peripheral region and the middle region.

In a possible embodiment of the present disclosure, the display region is of a rectangular shape, and a contour of each of the first surface and the second surface of the light guide plate is of a rectangular shape; the light guide plate includes a first lateral surface, a second lateral surface, a third lateral surface and a fourth lateral surface connected in an end-to-end manner, the first lateral surface is arranged at the film-fixed side, and the second lateral surface, the third lateral surface and the fourth lateral surface are arranged at the non-film-fixed side; and the non-fixed-side portion includes a second portion, a third portion and a fourth portion, the second portion is arranged close to the second lateral surface, the third portion is arranged close to the third lateral surface, and the fourth portion is arranged close to the fourth lateral surface.

In a possible embodiment of the present disclosure, the display region is of a rectangular shape other than a square shape, the display region includes a long boundary and a short boundary, the film-fixed side is arranged at a same side as the long boundary, and in the middle region, a minimum width of the second portion is greater than a minimum width of the third portion; and a minimum width of the fourth portion is greater than a minimum width of the third portion.

In a possible embodiment of the present disclosure, a layout density of the fluorescent material layer decreases gradually in a direction from the peripheral region pointing to the middle region.

In a possible embodiment of the present disclosure, the fixed-side portion includes a first layout region and a second layout region; a layout density m1 of the fixed-side portion in the first layout region is greater than or equal to 80%, and a layout density m2 of the fixed-side portion in the second layout region is greater than or equal to 30% and less than or equal to 50%; and a boundary of the second layout region close to the middle region coincides with the boundary of the middle region, the second layout region is arranged between the middle region and the first layout region, and a boundary of the second layout region away from the middle region coincides with a boundary of the first layout region close to the middle region.

In a possible embodiment of the present disclosure, the third portion includes a third layout region, a fourth layout region and a fifth layout region arranged in sequence; a layout density m3 of the third portion in the third layout region is greater than or equal to 80%, a layout density m4 of the third portion in the fourth layout region is greater than or equal to 30% and less than or equal to 50%, and a layout density m5 of the third portion in the fifth layout region is greater than or equal to 15% and less than or equal to 25%; a minimum distance d1 between an orthogonal projection of a boundary of the third layout region away from the middle region onto the light guide plate and a light guide boundary of the light guide plate arranged at a same side as the third layout region is less than or equal to 1.5 mm; a minimum distance d2 between an orthogonal projection of a boundary of the fourth layout region away from the middle region onto the light guide plate and the light guide boundary is greater than 1.5 mm and less than or equal to 5 mm; and a minimum distance d3 between an orthogonal projection of a boundary of the fifth layout region away from the middle region onto the light guide plate and the light guide boundary is greater than 5 mm and less than or equal to 9 mm.

In a possible embodiment of the present disclosure, the second portion includes a sixth layout region, a seventh layout region, an eighth layout region and a ninth layout region arranged in sequence; a layout density m6 of the second portion in the sixth layout region is greater than or equal to 80%, a layout density m7 of the second portion in the seventh layout region is greater than or equal to 30% and less than or equal to 50%, a layout density m8 of the second portion in the eighth layout region is greater than or equal to 15% and less than or equal to 25%, and a layout density m9 of the second portion in the ninth layout region is greater than or equal to 5% and less than or equal to 15%; a minimum distance d4 between an orthogonal projection of a boundary of the sixth layout region away from the middle region onto the light guide plate and a light guide boundary of the light guide plate arranged at a same side as the sixth layout region is less than or equal to 1.5 mm; a minimum distance d5 between an orthogonal projection of a boundary of the seventh layout region away from the middle region onto the light guide plate and the light guide boundary is greater than 1.5 mm and less than or equal to 5 mm; a minimum distance d6 between an orthogonal projection of a boundary of the eighth layout region away from the middle region onto the light guide plate and the light guide boundary is greater than 5 mm and less than or equal to 9 mm; a minimum distance d7 between an orthogonal projection of a boundary of the ninth layout region away from the middle region onto the light guide plate and the light guide boundary is greater than 9 mm and less than or equal to 11 mm; and a layout of the fourth portion is the same as a layout of the second portion.

In a possible embodiment of the present disclosure, the display module further includes a middle frame arranged at least around the non-film-fixed side; the middle frame covers a part of the edge of the light guide plate; the color conversion film layer includes an invalid portion, and at the non-film-fixed side, an orthogonal projection of the invalid portion onto the light guide plate is arranged within an orthogonal projection of the middle frame onto the light guide plate; the optical material layer includes a prism layer and a brightness enhancement film, and the prism layer is arranged between the color conversion film layer and the brightness enhancement film; and at the non-film-fixed side, an orthogonal projection of the prism layer onto the color conversion film layer and/or an orthogonal projection of the brightness enhancement film onto the color conversion film layer do not overlap the invalid portion.

In a possible embodiment of the present disclosure, the display module further includes a middle frame, the middle frame includes a first portion arranged at the lateral surface of the light guide plate and a second portion covering at least a part of the edge of the first surface; a width X of a target portion in the fluorescent material layer satisfies X=X1+X2+X3, X1 satisfies $$\frac{X1}{Y} = \frac{d1}{d2},$$

Y is a distance between the display panel and the color conversion film layer in a direction perpendicular to the display panel, d1 is a width of a boundary of the color conversion film layer beyond a boundary of the prism layer at a side where the target portion is located, d2 is an overall thickness of the optical material layer in the direction perpendicular to the display panel, X2 satisfies $$\frac{L}{5200} \times 6,$$

L is actually measured brightness of structures in the display module other than the display panel at the side where the target portion is located, X3 is a maximum width of the middle frame at the side where the target portion is located in a direction parallel to a reflection surface of the reflection sheet and in a direction perpendicular to the boundary of the middle region at the side where the target portion is located; and the target portion includes any one of the fixed-side portion, the second portion, the third portion and the fourth portion.

In a possible embodiment of the present disclosure, in the direction parallel to the reflection surface of the reflection sheet, the maximum width of the middle frame is less than or equal to 8 mm in the direction perpendicular to the boundary of the middle region at the side where the target portion is located.

In a possible embodiment of the present disclosure, the light guide plate is provided with a target boundary at a side where the at least a part of the edge is located, and a width of the at least a part of the edge is less than or equal to 10 mm in a direction parallel to the light guide plate and perpendicular to the target boundary.

In a possible embodiment of the present disclosure, in the middle region, the minimum width of the third portion is less than or equal to 4 mm, and the minimum width of the second portion and/or the minimum width of the fourth portion are less than or equal to 9 mm.

In a possible embodiment of the present disclosure, the lamp strip is arranged at the film-fixed side.

In a possible embodiment of the present disclosure, the lamp strip includes a lamp strip for emitting blue light, the fluorescent material layer includes a yellow fluorescent material layer, and the color conversion film layer includes a red/green quantum dot film.

In yet another aspect, the present disclosure further provides in some embodiments a display device, including the above-mentioned display module.

BRIEF DESCRIPTION OF THE DRAWINGS

The following drawings are provided to facilitate the understanding of the present disclosure, and constitute a portion of the description. These drawings and the following embodiments are for illustrative purposes only, but shall not be construed as limiting the present disclosure. In these drawings.

DETAILED DESCRIPTION

Figure 1:
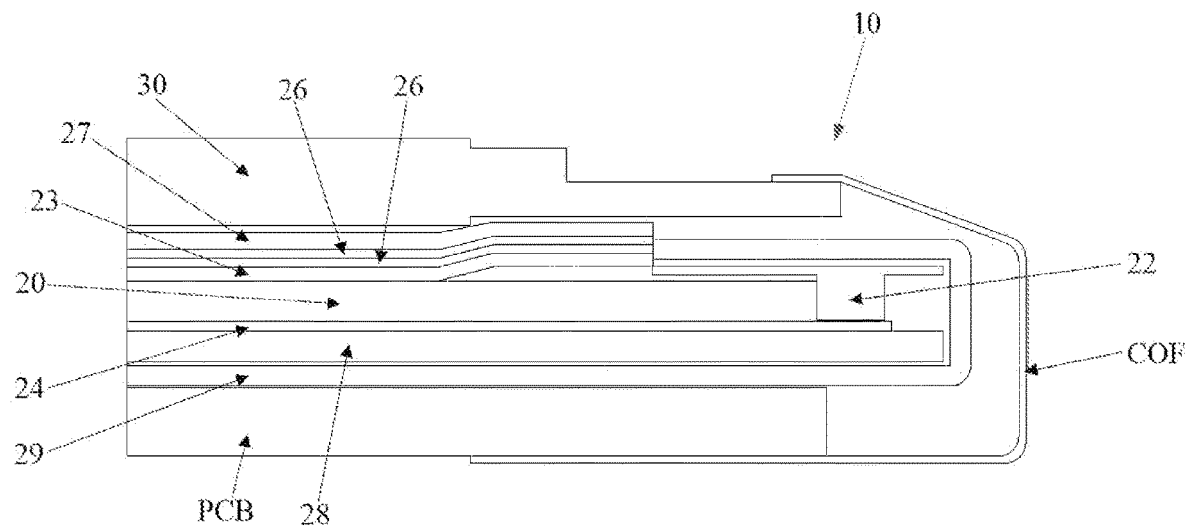
FIG. 1 is a sectional view of a display module at a film-fixed side according to one embodiment of the present disclosure.

In order to make the objects, the technical solutions and the advantages of the present disclosure more apparent, the present disclosure will be described hereinafter in a clear and complete manner in conjunction with the drawings and embodiments.

As shown in FIGS. 1, 2 and 4 to 7, the present disclosure provides in some embodiments a display module, which includes a film-fixed side 10 and a non-film-fixed side 11, and further includes: a light source, and a compensation structure, a color conversion film layer 23, an optical material layer and a display panel 30 laminated one on another. Light emitted by the light source passes through the color conversion film layer 23 and the optical material layer into the display panel 30; the optical material layer is fixed on the film-fixed side; and the compensation structure includes a middle region and a peripheral region surrounding the middle region at a side facing the color conversion film layer, an orthogonal projection of the middle region onto a plane where a light-exiting surface of the display panel 30 is located coincides with a display region of the display panel 30, an orthogonal projection of the peripheral region onto the plane where the light-exiting surface of the display panel 30 is located at least partially overlaps with a non-display region of the display panel 30, the peripheral region is provided with a fluorescent material layer for absorbing light emitted by the light source and generating target light; at least a part of the fluorescent material layer extends to the middle region; and in a direction parallel to the display panel 30, a minimum width of the fluorescent material layer at the film-fixed side in a direction perpendicular to a boundary of the middle region adjacent to the fluorescent material layer is less than a minimum width of the fluorescent material layer at the non-film-fixed side in a direction perpendicular to the boundary of the middle region adjacent to the fluorescent material layer.

For example, a boundary of the display region includes a straight boundary or a curved boundary. Thus, the boundary of the middle region includes a straight boundary or a curved boundary. When the boundary of the middle region is a curved boundary, the direction perpendicular to the boundary of the middle region is a tangent line perpendicular to the curved boundary.

For example, the color conversion film layer 23 includes a quantum dot film layer. The light emitted by the light source enters the quantum dot film layer and excites the quantum dot film layer to generate light in a corresponding color, and the light in the corresponding color is mixed with the light emitted by the light source to form white light toward the display panel 30.

For example, the optical material layer is fixed on the film-fixed side 10, a middle frame 21 in the display module surrounds the optical material layer at the non-film-fixed side 11, and there is an expansion space reserved between the optical material layer and the middle frame 21 at the non-film-fixed side 11.

For example, the optical material layer is fixed on the film-fixed side 10 through an adhesive tape or a hanger.

For example, the middle frame 21 also surrounds the film-fixed side 10, and there is no expansion space between the optical material layer and the middle frame 21 at the film-fixed side 10.

For example, at the film-fixed side 10, an edge portion of the optical material layer is pressed by an adhesive frame, a clamping groove is arranged in a back plate arranged at the film-fixed side 10, and the edge portion of the optical material layer is fixed into the clamping groove, so as to fix the optical material layer on the film-fixed side 10 firmly.

For example, the compensation structure includes the middle region of a rectangular shape and the peripheral region surrounding the middle region. The peripheral region is provided with the fluorescent material layer for absorbing light emitted by the light source and generating target light, and the target light passes through the color conversion film layer 23 and the optical material layer into the display panel 30. For example, the fluorescent material layer 25 is formed through printing.

For example, the display panel 30 includes the display region and the non-display region surrounding the display region. An orthogonal projection of the middle region onto the display panel 30 coincides with the display region of the display panel 30, and an orthogonal projection of the peripheral region onto the display panel 30 at least partially overlaps with the non-display region of the display panel 30.

For example, the orthogonal projection of the middle region onto the plane where the light-exiting surface of the display panel is located coincides with the display region of the display panel 30, and an orthogonal projection of the non-display region of the display panel 30 onto the reflection sheet is arranged within the peripheral region.

For example, the display panel 30 includes a liquid crystal display panel 30.

For example, at least a part of the fluorescent material layer 25 extends to the middle region, so that an orthogonal projection of the at least a part of the fluorescent material layer 25 onto the plane where the light-exiting surface of the display panel is located is arranged within the display region.

For example, the light source emits blue light, and the fluorescent material layer 25 includes a yellow fluorescent material layer for absorbing a part of the blue light and generating white light. For example, the display module further includes the color conversion film layer 23 for absorbing the blue light and generating red light and green light, and the red light, the green light and the unabsorbed blue light are mixed to form white light.

It should be appreciated that, when the display module includes an edge-type backlight source, in the case that a lamp strip 20 is arranged at the film-fixed side 10, light emitted by the lamp strip 20 has a strong light intensity at the film-fixed side, so the light from the display module at the film-fixed side 10 is in a color approaching to the color of the light emitted by the lamp strip. Due to the expansion space reserved between the optical material layer and the middle frame 21 at the non-film-fixed side 11, it is impossible to reflect the light emitted by the light source for many times at the non-film-fixed side 11, i.e., it is impossible to excite the color conversion film layer 23 for many times. At this time, the excitation efficiency of the color conversion film layer 23 at the non-film-fixed side 11 is lower than the excitation efficiency of the color conversion film layer 23 in the middle, and thereby the light from the display module at the non-film-fixed side 11 is in a color approaching to the color of the light emitted by the lamp strip. For example, when the light source emits blue light, a color temperature of the light emitted by the color conversion film layer 23 at four sides is higher, so the light from the display module at four sides may be bluish.

According to the specific structure of the display module in the embodiments of the present disclosure, the peripheral region of the compensation structure is provided with the fluorescent material layer 25 for absorbing the light emitted by the light source and generating the target light. As a result, it is able to improve the utilization of the light emitted by the light source in the peripheral region, prevent the occurrence of a display defect at a periphery of the liquid crystal display when the light at a periphery of the display module is in a color approaching to the color of the light emitted by the light source, and provide the back light of the entire display module with a more uniform color temperature, thereby to improve a visual effect.

According to the display module in the embodiments of the present disclosure, the at least a part of the fluorescent material layer 25 extends to the middle region, so it is able to improve the utilization of the light emitted by the light source at the edge of the middle region, thereby to further prevent the occurrence of the display defect at the periphery of the liquid crystal display when the light at the periphery of the display module is in a color approaching to the color of the light emitted by the light source.

There is no expansion space between the optical material layer and the middle frame 21 at the film-fixed side 10, so the light emitted by the light source is reflected for many times at the film-fixed side 10, and thereby the color conversion film layer 23 is excited for many times. As a result, a degree of polarization of the display module at the film-fixed side 10 is less than a degree of polarization of the display module at the non-film-fixed side 11. In the embodiments of the present disclosure, in a direction parallel to the display panel 30, the minimum width of the fluorescent material layer 25 at the film-fixed side 10 in a direction perpendicular to the boundary of the compensation structure adjacent to the fluorescent material layer is less than the minimum width of the fluorescent material layer 25 at the non-film-fixed side 11 in a direction perpendicular to the boundary of the compensation structure adjacent to the fluorescent material layer, so it is able to provide the back light of the entire display module with a more uniform color temperature, thereby to improve the visual effect in a better manner.

It should be appreciated that, in the embodiments of the present disclosure, at a junction between two sides of the display module, the fluorescent material layer may be converged, so it is difficult to determine a width of the fluorescent material layer at the junction. In this regard, it is unnecessary to measure the width of the fluorescent material layer at the junction.

As shown in FIGS. 1, 2 and 4 to 7, in some embodiments of the present disclosure, the light source further includes a light guide plate 20 and a lamp strip 22, and the light guide plate 20 includes a first surface and a second surface arranged opposite to each other and a lateral surface arranged between the first surface and the second surface. The lamp strip 22 is arranged at the lateral surface of the light guide plate 20, and light emitted by the lamp strip 22 enters the light guide plate 20 from the lateral surface of the light guide plate 20. The color conversion film layer 23 is arranged at the first surface of the light guide plate 20, and the optical material layer is arranged at a side of the color conversion film layer 23 away from the light guide plate 20. The compensation structure includes a reflection sheet 24 arranged at the second surface of the light guide plate 20, and the peripheral region of the reflection sheet 24 is provided with the fluorescent material layer 25.

For example, when the display module is applied to a drawing tablet, the display module further includes an electromagnetic film 28 to achieve a normal writing and drawing function through a stylus. For example, the electromagnetic film 28 is used to sense position information about the stylus and display an image on the display module. For example, a contour of the display region of the display module is of a rectangular shape, and a diagonal length of the display module is 6 inches to 35 inches.

Figure 2:
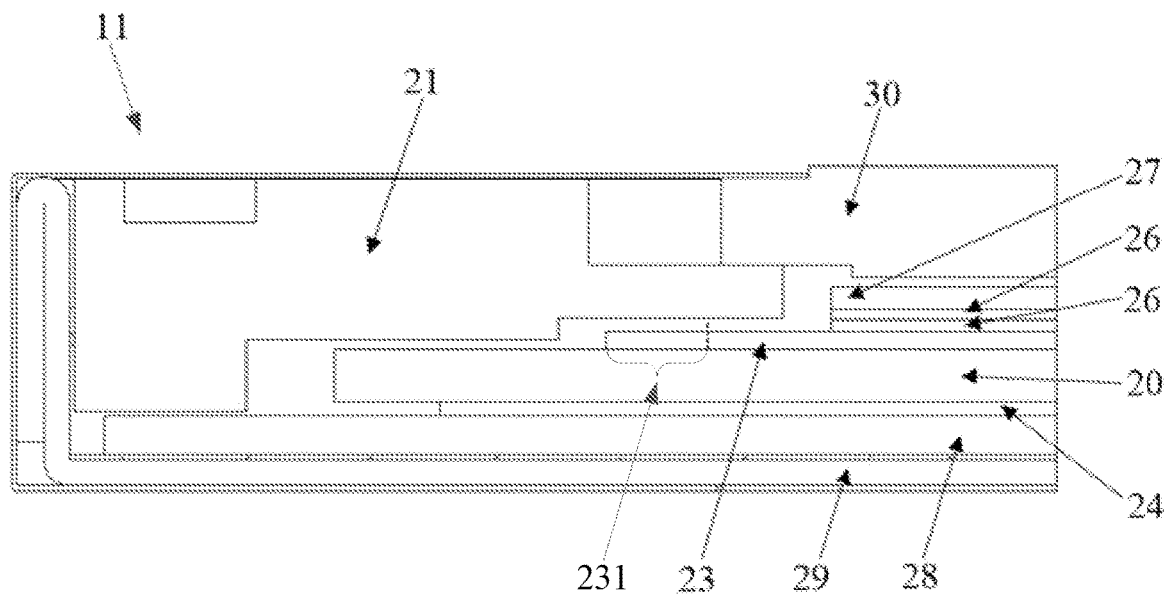
FIG. 2 is a sectional view of the display module at a non-film-fixed side opposite to the film-fixed side according to one embodiment of the present disclosure.

In a possible embodiment of the present disclosure, as shown in FIG. 2, on at least one side, an orthogonal projection of a boundary of the reflection sheet 24 onto the electromagnetic film 28 is arranged within an orthogonal projection of the light guide plate 20 onto the electromagnetic film 28. In a possible embodiment of the present disclosure, the display module further includes a fixing adhesive arranged between the light guide plate 20 and the electromagnetic film 28, and the reflection sheet 24, the light guide plate 20, and the electromagnetic film 28 are fixed together through the fixing adhesive. In a possible embodiment of the present disclosure, as shown in FIG. 1 and FIG. 2, in order to facilitate the arrangement of the lamp strip 22, the fixing adhesive is not arranged at a same side as the lamp strip 22. In a possible embodiment of the present disclosure, the fixing adhesive is arranged at a side opposite to the lamp strip 22. In a possible embodiment of the present disclosure, as shown in FIGS. 1, 2, 4 and 5, at the non-film-fixed side 11 adjacent to the film-fixed side 10, the orthogonal projection of the boundary of the reflection sheet 24 onto the electromagnetic film 28 at least partially overlaps with the orthogonal projection of the light guide plate 20 onto the electromagnetic film 28, so as to maximize a reflective effect of the reflection sheet and a light conversion effect of the compensation structure, thereby to improve a display effect.

In a possible embodiment of the present disclosure, as shown in FIGS. 1, 2 and 4 to 7, at the side where the lamp strip 22 is located, the orthogonal projection of the boundary of the reflection sheet 24 onto the electromagnetic film 28 is arranged within an orthogonal projection of the lamp strip 22 onto the electromagnetic film 28. In this way, it is able for the reflection sheet 24 to not only reflect the light in the light guide plate 20, but also directly reflect the light emitted by the lamp strip 22.

For example, at the side where the lamp strip 22 is located, the orthogonal projection of the boundary of the reflection sheet 24 onto the electromagnetic film 28 is arranged within an orthogonal projection of a light-emitting diode (LED) of the lamp strip 22 onto the electromagnetic film 28. In a possible embodiment of the present disclosure, at the side where the lamp strip 22 is located, an orthogonal projection of the reflection sheet 24 onto the electromagnetic film 28 at least partially overlaps with the orthogonal projection of a boundary of the LED of the lamp strip 22 away from the light guide plate 20 onto the electromagnetic film 28. In this way, it is able to perform the light conversion through the fluorescent material layer 25, and prevent the light from one side of the lamp strip 22 from being bluish. In a possible embodiment of the present disclosure, at the side where the lamp strip 22 is located, an orthogonal projection of a boundary of the light guide plate 20 onto the electromagnetic film 28 is arranged within the orthogonal projection of the reflection sheet 24 onto the electromagnetic film 28, so as to avoid the lamp strip 22 and provide a more compact structure. In a possible embodiment of the present disclosure, as shown in FIG. 1, the film-fixed side is the same as a side where the lamp strip 22 is located.

As shown in FIG. 2, on at least one side, an orthogonal projection of the boundary of the reflection sheet 24 onto the back plate 29 in a direction perpendicular to the display panel is arranged within an orthogonal projection of the light guide plate 20 onto the back plate 29 in the direction perpendicular to the display panel.

In a possible embodiment of the present disclosure, as shown in FIGS. 1, 2, 4 and 5, at the non-film-fixed side 11 adjacent to the film-fixed side 10, the orthogonal projection of the boundary of the reflection sheet 24 onto the back plate 29 in the direction perpendicular to the display panel at least partially overlaps with the orthogonal projection of the boundary of the of the light guide plate 20 onto the back plate 29 in the direction perpendicular to the display panel, so as to maximize the reflective effect of the reflection sheet and the light conversion effect of the compensation structure, thereby to improve the display effect.

In a possible embodiment of the present disclosure, as shown in FIGS. 1, 2 and 4 to 7, at the side where the lamp strip 22 is arranged, the orthogonal projection of the boundary of the reflection sheet 24 onto the back plate 29 in the direction perpendicular to the display panel is arranged within an orthogonal projection of the lamp strip 22 onto the back plate 29 in the direction perpendicular to the display panel. In this way, it is able for the reflection sheet 24 to not only reflect the light in the light guide plate 20, but also directly reflect the light emitted by the lamp strip 22.

For example, at the side where the lamp strip 22 is arranged, the orthogonal projection of the boundary of the reflection sheet 24 onto the back plate 29 in the direction perpendicular to the display panel is arranged within an orthogonal projection of the LED of the lamp strip 22 onto the back plate 29 in the direction perpendicular to the display panel. In a possible embodiment of the present disclosure, at the side where the lamp strip 22 is arranged, an orthogonal projection of the reflection sheet 24 onto the back plate 29 in the direction perpendicular to the display panel at least partially overlaps with the orthogonal projection of the LED of the lamp strip 22 away from the boundary of the light guide plate 20 onto the back plate 29 in the direction perpendicular to the display panel. In this way, it is able to perform the light conversion through the fluorescent material layer 25, thereby to prevent the light at one side of the lamp strip 22 from being bluish. In a possible embodiment of the present disclosure, at the side where the lamp strip 22 is arranged, an orthogonal projection of the boundary of the light guide plate 20 onto the back plate 29 in the direction perpendicular to the display panel is arranged within the orthogonal projection of the reflection sheet 24 onto the back plate 29 in the direction perpendicular to the display panel, so as to avoid the lamp strip 22 and provide a more compact design. In a possible embodiment of the present disclosure, as shown in FIG. 1, the film-fixed side is the same as the side where the lamp strip 22 is arranged.

For example, the display module further includes a middle frame 21 arranged around the non-film-fixed side 11.

For example, the reflection sheet 24 is arranged at the second surface of the light guide plate 20, the reflection sheet 24 includes a middle region 241 and a peripheral region 242 surrounding the middle region 241, an orthogonal projection of the middle region 241 onto the display panel 30 coincides with the display region of the display panel 30, an orthogonal projection of the peripheral region 242 onto the display panel 30 at least partially overlaps with the non-display region of the display panel 30, the peripheral region 242 is provided with the fluorescent material layer 25 for absorbing the light emitted by the lamp strip 22 and generating target light, and at least a part of the fluorescent material layer 25 extends to the middle region 241.

It should be appreciated that, FIG. 1 further shows a chip-on-film (COF), the back plate 29 and a printed circuit board (PCB).

For example, the light guide plate 20 includes a first surface and a second surface arranged opposite to each other, the first surface is arranged at a light-exiting side of the light guide plate 20, the second surface is arranged at a non-light-exiting side of the light guide panel 20, and the light in the light guide plate 20 exits from the first surface to provide a light source for a matched display panel 30.

For example, the middle frame 21 includes an adhesive frame. The middle frame 21 surrounds the non-film-fixed side 11, and a part of the middle frame 21 is arranged at the lateral surface of the light guide plate 20.

For example, the lamp strip 22 is arranged at the lateral surface of the light guide plate 20, and the light emitted by the lamp strip 22 enters the light guide plate 20 from the lateral surface of the light guide plate 20.

For example, the color conversion film layer 23 includes a quantum dot film layer. The light emitted by the lamp strip 22 enters the quantum dot film layer and excites the quantum dot film layer to generate light in a corresponding color, and the light in the corresponding color is mixed with the light emitted by the lamp strip 22 to form white light toward the display panel 30.

For example, the optical material layer is fixed on the film-fixed side 10, the middle frame 21 surrounds the optical material layer at the non-film-fixed side 11, and there is an expansion space reserved between the optical material layer and the middle frame 21 at the non-film-fixed side 11.

For example, the reflection sheet 24 is arranged close to the second surface of the light guide plate 20. The light emitted by the lamp strip 22 passes through the second surface to the reflection sheet 24, then is reflected back to the light guide plate 20 by the reflection sheet 2, and finally exits from the first surface of the light guide plate 20.

For example, the reflection sheet 24 includes the middle region 241 of a rectangular shape and the peripheral region 242 surrounding the middle region 241. The peripheral region 242 is provided with the fluorescent material layer 25 for absorbing light emitted by the lamp strip 22 and generating target light, and the target light is reflected back to the light guide plate 20 and finally exits from the first surface of the light guide plate 20. For example, the fluorescent material layer 25 is formed through printing.

For example, at least a part of the fluorescent material layer 25 extends to the middle region 241, so that an orthogonal projection of the at least a part of the fluorescent material layer 25 onto the display panel 30 is arranged within the display region.

For example, the lamp strip 22 includes a blue LED, and the fluorescent material layer 25 includes a yellow fluorescent material layer for absorbing a part of blue light emitted by the blue LED and generating white light. For example, the display module further includes the color conversion film layer 23 for absorbing the blue light and generating red light and green light, and the red light, the green light and unabsorbed blue light are mixed to form the white light.

According to the display module in the embodiments of the present disclosure, the peripheral region 242 of the reflection sheet 24 is provided with the fluorescent material layer 25 for absorbing the light emitted by the lamp strip 22 and generating the target light. As a result, it is able to improve the utilization of the light emitted by the lamp strip 22 in the peripheral region 242, prevent the occurrence of a display defect at the periphery of the liquid crystal display when the color of the light at the periphery of the display module approaches to the color of the light emitted by the lamp strip 22, and provide the entire back light with a more uniform color temperature, thereby to improve the visual effect.

According to the display module in the embodiments of the present disclosure, the at least a part of the fluorescent material layer 25 extends to the middle region 241. As a result, it is able to improve the utilization of the light emitted by the lamp strip 22 at the edge of the middle region 241, thereby to further prevent the occurrence of the display defect at the periphery of the liquid crystal display when the color of the light at the periphery of the display module approaches to the color of the light emitted by the lamp strip 22.

In some embodiments of the present disclosure, the light source includes a lamp plate, the lamp plate is arranged at a side of the color conversion film layer away from the optical material layer, the lamp plate is reused as the compensation structure, and a peripheral region of the lamp plate is provided with the fluorescent material layer.

For example, the light panel includes a middle region and a peripheral region surrounding the middle region at a side facing the color conversion film layer, an orthogonal projection of the middle region onto the display panel 30 coincides with a display region of the display panel 30, an orthogonal projection of the peripheral region onto the display panel 30 at least partially overlaps with a non-display region of the display panel 30, and the peripheral region is provided with the fluorescent material layer for absorbing light emitted by the light source and generating target light.

For example, the display module further includes a diffusion sheet, located between the lamp plate and the color conversion film layer and configured to diffuse light.

For example, the light plate emits blue light, and the fluorescent material layer 25 includes a yellow fluorescent material layer for absorbing a part of the blue light and generating white light.

According to the display module in the embodiments of the present disclosure, the peripheral region 242 of the lamp plate is provided with the fluorescent material layer 25 for absorbing the light emitted by the lamp plate and generating the target light. As a result, it is able to improve the utilization of the light emitted by the lamp plate in the peripheral region 242, prevent the color of the light at a periphery of the display region of the display module from approaching to the color of the light emitted by the lamp plate, and provide the back light with a more uniform color temperature, thereby to improve the visual effect.

According to the display module in the embodiments of the present disclosure, the at least a part of the fluorescent material layer 25 extends to the middle region 241. As a result, it is able to improve the utilization of the light emitted by the lamp plate at the edge of the middle region 241, thereby to prevent the occurrence of the display defect at a periphery of the liquid crystal display when the color of the light at a periphery of the display region of the display module approaches to the color of the light emitted by the lamp plate.

In the embodiments of the present disclosure, the fluorescent material layer 25 includes a mixed material layer of ink and fluorescent powder, and a mass percentage of the ink to the fluorescent powder ranges from 100/40.5 to 100/24.5, with endpoints being inclusive.

For example, the mass percentage of the ink to the fluorescent powder ranges from 100/40 to 100/25.

For example, the ink and the fluorescent powder are mixed at the above-mentioned mass percentage, and the fluorescent material layer 25 is formed through a printing process. Due to excellent stability of both the ink and the fluorescent powder, the formed fluorescent material layer 25 still meets the above-mentioned mass percentage. In addition, chemical properties of the ink are stable, so the ink is not volatile or not easily subject to mass changes.

For example, the ink includes transparent ink. A main component of the fluorescent powder is at least one of Yttrium Aluminum Garnet (YAG) fluorescent powder and nitride fluorescent powder which are commonly used by an LED.

According to the display module in the embodiments of the present disclosure, the mass percentage of the ink to the fluorescent powder ranges from 100/40.5 to 100/24.5, so it is able to not only improve the utilization of the light emitted by the light source in the peripheral region 242 as well as the uniformity of the color temperature of the back light, but also reduce the manufacture cost of the display module.

Through adjusting a concentration of the yellow fluorescent powder, it is able to prevent the light from being bluish at a periphery of a liquid crystal display product with a high color gamut quantum dot film and an edge-type blue LED, such as a drawing tablet.

In the embodiments of the present disclosure, the mass percentage of the ink to the fluorescent powder ranges from 100/25.5 to 100/24.5.

In this way, it is able to make a compromise between the manufacture cost and the uniformity of the color temperature of the back light, i.e., it is able to reduce the manufacture cost to the maximum extent while ensuring the uniformity of the color temperature.

In the embodiments of the present disclosure, a thickness of the fluorescent material layer 25 in a direction perpendicular to the color conversion film layer 23 ranges from 5 μm to 6 μm, with endpoints being inclusive.

When the thickness of the fluorescent material layer 25 is set between 5 μm and 6 μm, it is able to improve the uniformity of the color temperature of the back light and prevent an overall thickness of the display module from being adversely affected by the thickness of the fluorescent material layer 25.

Figure 6:
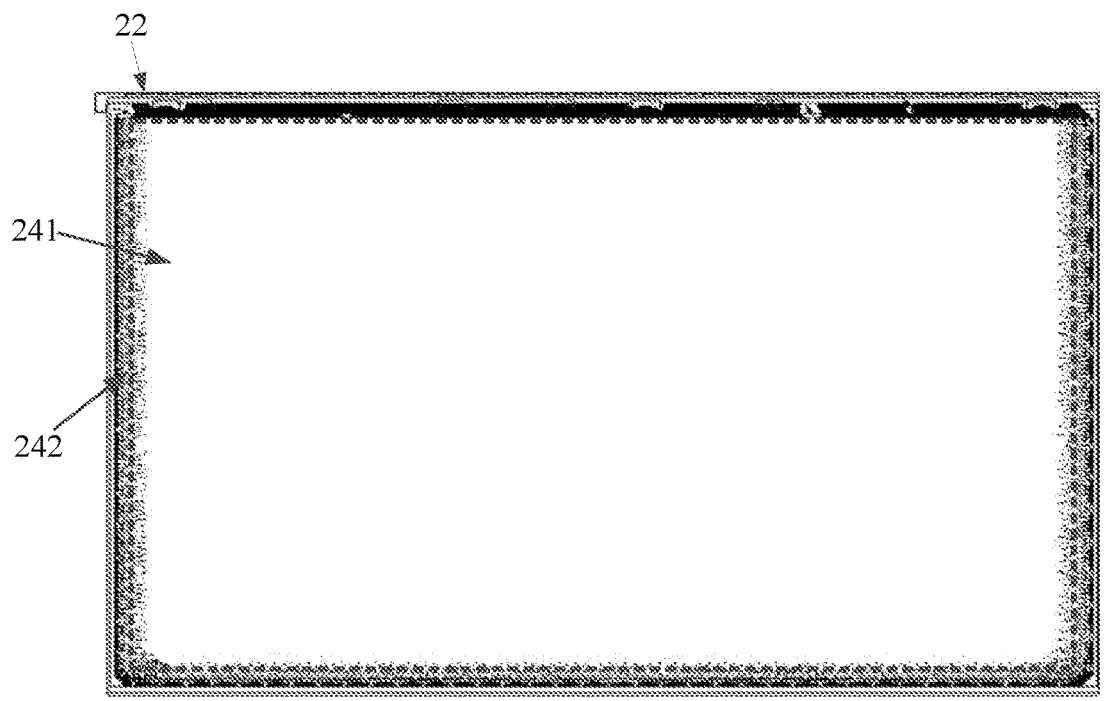
FIG. 6 is a top view of a light source and a reflection sheet according to one embodiment of the present disclosure.
Figure 7:
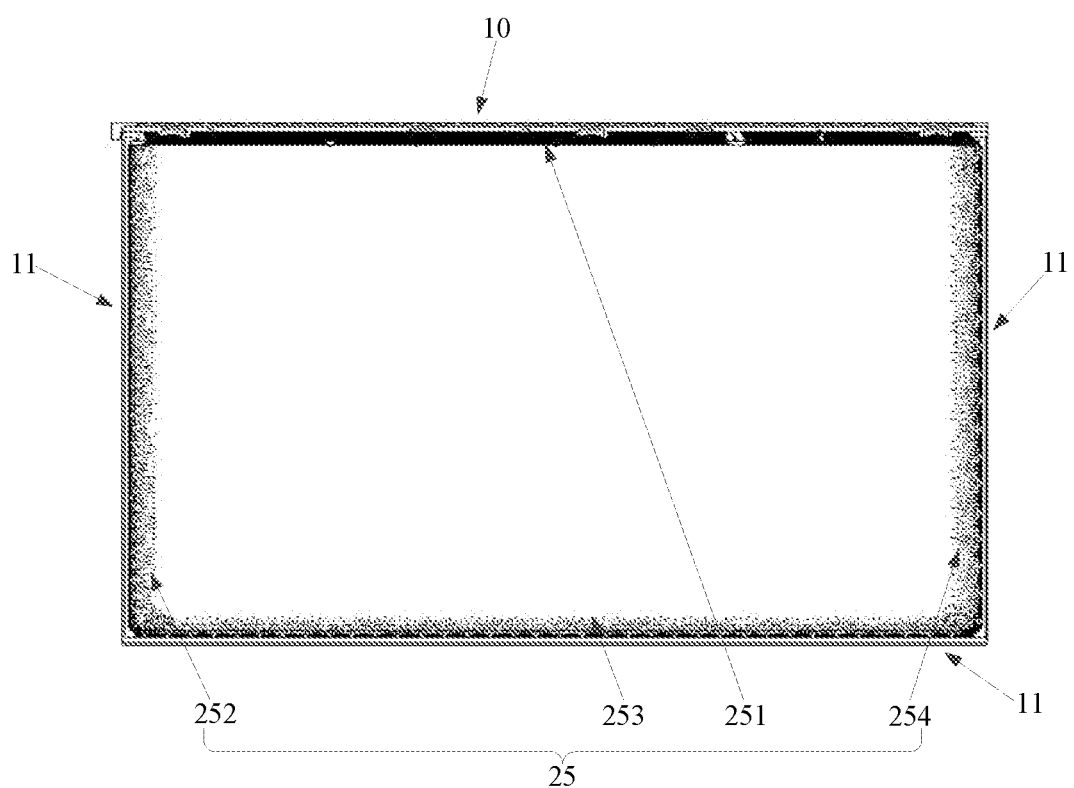
FIG. 7 is a schematic view showing a fluorescent material layer according to one embodiment of the present disclosure.

As shown in FIG. 6 and FIG. 7, in the embodiments of the present disclosure, the fluorescent material layer 25 includes a fixed-side portion 251 arranged at the film-fixed side 10 and merely arranged in the peripheral region 242.

For example, the fixed-side portion 251 is of a strip-like shape and extends along the boundary of the reflection sheet 24 at the film-fixed side 10.

The optical material layer is fixed on the film-fixed side 10, so it is unnecessary to reserve an expansion space for the optical material layer at the film-fixed side 10, and the optical material layer covers the color conversion film layer 23. In this regard, at the film-fixed side 10, the light emitted by the light source is reflected throughout the optical structure to realize multiple excitation. Taking a blue light source in combination with a red/green quantum dot film as an example, the blue light emitted by the light source is greatly absorbed, resulting in a decrease in the component of the blue light and an increase in the component of the red light and the green light, so the light color of the display module at the film-fixed side 10 turns white. In this way, it is able improve the uniformity of the color temperature of the display module at the film-fixed side 10. It should be appreciated that, the wavelength of light is changed when red quantum dots and green quantum dots absorb the blue light, and reflection and refraction do not cause any change in the wavelength of light but increase a probability of multiple excitation and absorption.

In this regard, at the film-fixed side 10, the fixed-side portion 251 is merely arranged in the peripheral region 242, so as to improve the uniformity of the color temperature of the display module at the film-fixed side 10.

As shown in FIG. 6 and FIG. 7, in the embodiments of the present disclosure, the fluorescent material layer 25 includes a non-fixed-side portion arranged at the non-film-fixed side 11 and arranged in the peripheral region 242 and the middle region 241.

For example, the non-fixed-side portion extends along the boundary of the reflection sheet 24 at the non-film-fixed side 11.

At the non-film-fixed side 11, an expansion space is reserved between the optical material layer and the middle frame 21, so at the non-film-fixed side 11, the optical material layer does not cover the color conversion film layer 23. In this way, light is reflected less frequently throughout the optical structure at the non-film-fixed side 11.

According to the display module in the embodiments of the present disclosure, the non-fixed-side portion is arranged in the peripheral region 242 and the middle region 241 at the non-film-fixed side 11, so as to further improve the utilization of the light emitted by the light source at the non-film-fixed side 11, thereby to improve the uniformity of the color temperature of the display module at the at the non-film-fixed side 11.

As shown in FIG. 6 and FIG. 7, in the embodiments of the present disclosure, the display region is of a rectangular shape, and a contour of each of the first surface and the second surface of the light guide plate is of a rectangular shape; the light guide plate 20 includes a first lateral surface, a second lateral surface, a third lateral surface and a fourth lateral surface connected in an end-to-end manner, the first lateral surface is arranged at the film-fixed side 10, and the second lateral surface, the third lateral surface and the fourth lateral surface are arranged at the non-film-fixed side 11; and the non-fixed-side portion includes a second portion 252, a third portion 253 and a fourth portion 254, the second portion 252 is arranged close to the second lateral surface, the third portion 253 is arranged close to the third lateral surface, and the fourth portion 254 is arranged close to the fourth lateral surface.

For example, the light guide plate 20 is of a hexahedral structure, and includes the first surface, the second surface, and the first lateral surface, the second lateral surface, the third lateral surface and the fourth lateral surface connected in an end-to-end manner. The first lateral surface is arranged opposite to the third lateral surface, and the second lateral surface is arranged opposite to the fourth lateral surface.

For example, the fixed-side portion 251, the second portion 252, the third portion 253 and the fourth portion 254 are formed integrally.

For example, the second portion 252, the third portion 253 and the fourth portion 254 are arranged in the peripheral region 242 and the middle region 241.

As shown in FIG. 6 and FIG. 7, in the embodiments of the present disclosure, the display region is of a rectangular shape other than a square shape, the display region includes a long boundary and a short boundary, the film-fixed side is arranged at a same side as the long boundary, and in the middle region 241, a minimum width of the second portion 252 is greater than a minimum width of the third portion 253; and a minimum width of the fourth portion 254 is greater than a minimum width of the third portion 253.

For example, the display region includes two long boundaries and two short boundaries, and the film-fixed side is arranged at a same side as one of the long boundaries For example, the reflection sheet 24 includes a first boundary, a second boundary, a third boundary and a fourth boundary, the first boundary is arranged at a same side as the fixed-side portion 251, the second boundary is arranged at a same side as the second portion 252, the third boundary is arranged at a same side as the third portion 253, and the fourth boundary is arranged at a same side as the fourth portion 254.

For example, in the middle region 241, in a direction parallel to the reflection sheet 24, a minimum width of the second portion 252 in a direction perpendicular to the second boundary is greater than a minimum width of the third portion 253 in a direction perpendicular to the third boundary, and a minimum width of the fourth portion 254 in a direction perpendicular to the fourth boundary is greater than the minimum width of the third portion 253.

For example, the display module includes two long sides and two short sides, the long sides extend transversely, and the short sides extend longitudinally. The film-fixed side 10 is arranged at one of the long sides of the display module, and the non-film-fixed side 11 is arranged at the other long side and the two short sides of the display module. The third portion 253 is arranged at a same side as the other long side, the second portion 252 is arranged at a same side as one of the short sides, and the fourth portion 254 is arranged at a same side as the other short side.

The optical material layer has a larger length in an extending direction of the long side, so it is necessary to provide a wide expansion space between the optical material layer and the middle frame 21 at each short side. In addition, the optical material layer has a smaller length in an extending direction of the short side, so it is necessary to provide a narrow expansion space between the optical material layer and the middle frame 21 at each long side. The larger the expansion space, the larger the width of the fluorescent material layer 25, so as to improve the utilization of the light emitted by the light source. The smaller the expansion space, the smaller the width of the fluorescent material layer 25, so as to improve the utilization of the light emitted by the light source appropriately and prevent the occurrence of a yellowish phenomenon around the display module.

According to the display module in the embodiments of the present disclosure, in the middle region 241, the minimum width of the second portion 252 is greater than the minimum width of the third portion 253, and the minimum width of the fourth portion 254 is greater than the minimum width of the third portion 253. In this way, it is able to improve the utilization of the light emitted by the light source at the non-film-fixed side 11 appropriately, thereby to not only improve the uniformity of the color temperature of the display module at the at the non-film-fixed side 11 effectively, but also prevent the occurrence of a yellowish phenomenon around the display module.

It should be appreciated that, according to the display module in the embodiments of the present disclosure, a side of one of the long sides of the display module is set as the film-fixed side, i.e., the optical material layer and the lamp strip in the light source are both arranged at the side of one of the long sides of the display module. In this way, it is able to provide the display module with a narrow frame. In addition, the lamp strip is provided with a larger length, so as to improve the brightness of the display module.

As shown in FIG. 6 and FIG. 7, in the embodiments of the present disclosure, a layout density of the fluorescent material layer 25 decreases gradually in a direction of the peripheral region 242 pointing to the middle region 241.

For example, the layout density of the fluorescent material layer 25 is a proportion of a distribution area of a fluorescent material to a unit area of the fluorescent material layer 25. For example, the fluorescent material layer 25 is formed through a printing process, and the layout density of the fluorescent material layer 25 is controlled through controlling a density of printed dots in different regions.

The phenomenon that the color of the light emitted by the display module approaches to the color of the light source is gradually weakened in the direction from the peripheral region 242 to the middle region 241, so when the layout density of the fluorescent material layer 25 decreases gradually in the direction from the peripheral region 242 to the middle region 241, it is able to prevent the color of the light at the periphery of the display module from approaching to the color of the light emitted by the light source, and prevent the occurrence of a yellowish phenomenon around the display module.

As shown in FIG. 6 and FIG. 7, in the embodiments of the present disclosure, the fixed-side portion 251 includes a first layout region and a second layout region; a layout density m1 of the fixed-side portion 251 in the first layout region is greater than or equal to 80%, and a layout density m2 of the fixed-side portion 251 in the second layout region is greater than or equal to 30% and less than or equal to 50%; and a boundary of the second layout region close to the middle region 241 coincides with the boundary of the middle region 241, the second layout region is arranged between the middle region 241 and the first layout region, and a boundary of the second layout region away from the middle region 241 coincides with a boundary of the first layout region close to the middle region 241.

As shown in FIG. 6 and FIG. 7, in the embodiments of the present disclosure, the third portion 253 includes a third layout region, a fourth layout region and a fifth layout region arranged in sequence; a layout density m3 of the third portion 253 in the third layout region is greater than or equal to 80%, a layout density m4 of the third portion 253 in the fourth layout region is greater than or equal to 30% and less than or equal to 50%, and a layout density m5 of the third portion 253 in the fifth layout region is greater than or equal to 15% and less than or equal to 25%; a minimum distance d1 between an orthogonal projection of a boundary of the third layout region away from the middle region 241 onto the light guide plate and a light guide boundary of the light guide plate arranged at a same side as the third layout region is less than or equal to 1.5 mm; a minimum distance d2 between an orthogonal projection of a boundary of the fourth layout region away from the middle region 241 onto the light guide plate and the light guide boundary is greater than 1.5 mm and less than or equal to 5 mm; and a minimum distance d3 between an orthogonal projection of a boundary of the fifth layout region away from the middle region 241 onto the light guide plate and the light guide boundary is greater than 5 mm and less than or equal to 9 mm.

As shown in FIG. 6 and FIG. 7, in the embodiments of the present disclosure, the second portion 252 includes a sixth layout region, a seventh layout region, an eighth layout region and a ninth layout region arranged in sequence; a layout density m6 of the second portion 252 in the sixth layout region is greater than or equal to 80%, a layout density m7 of the second portion 252 in the seventh layout region is greater than or equal to 30% and less than or equal to 50%, a layout density m8 of the second portion 252 in the eighth layout region is greater than or equal to 15% and less than or equal to 25%, and a layout density m9 of the second portion 252 in the ninth layout region is greater than or equal to 5% and less than or equal to 15%; a minimum distance d4 between an orthogonal projection of a boundary of the sixth layout region away from the middle region 241 onto the light guide plate and a light guide boundary of the light guide plate arranged at a same side as the sixth layout region is less than or equal to 1.5 mm; a minimum distance d5 between an orthogonal projection of a boundary of the seventh layout region away from the middle region 241 onto the light guide plate and the light guide boundary is greater than 1.5 mm and less than or equal to 5 mm; a minimum distance d6 between an orthogonal projection of a boundary of the eighth layout region away from the middle region 241 onto the light guide plate and the light guide boundary is greater than 5 mm and less than or equal to 9 mm; a minimum distance d7 between an orthogonal projection of a boundary of the ninth layout region away from the middle region 241 onto the light guide plate and the light guide boundary is greater than 9 mm and less than or equal to 11 mm; and the fourth portion 254 is arranged in a same layout manner as the second portion 252.

For example, the layout densities of the first layout region, the third layout region and the sixth layout region include 100%, the layout densities of the second layout region, the fourth layout region and the seventh layout region include 40%, the layout densities of the fifth layout region and the eighth layout region include 20%, and the layout density of the ninth layout region includes 10%.

According to the display module in the embodiments of the present disclosure, through controlling the layout density of the fluorescent material layer 25 in different layout regions, it is able to prevent the color of the light at the periphery of the display module from approaching to the color of the light emitted by the light source, and prevent the occurrence of a yellowish phenomenon around the display module.

As shown in FIGS. 1, 2, 4 and 5, in the embodiments of the present disclosure, the display module further includes a middle frame 21 arranged at least around the non-film-fixed side 11; the middle frame 21 covers a part of an edge of the light guide plate 20; and the color conversion film layer 23 includes an invalid portion 231, and at the non-film-fixed side, an orthogonal projection of the invalid portion 231 onto the light guide plate 20 is arranged within an orthogonal projection of the middle frame 21 onto the light guide plate 20.

For example, a minimum width of the invalid portion 231 in a direction parallel to the light guide plate 20 is between 1 mm and 1.5 mm, with endpoints being inclusive. The invalid portion 231 is completely covered by the middle frame 21.

For example, at the film-fixed side 10, an orthogonal projection of the boundary of the optical material layer onto the light guide plate is arranged within an orthogonal projection of the color conversion film layer 23 onto the light guide plate.

The color conversion film layer 23 includes a quantum dot film, a quantum dot material in the quantum dot film is easy to fail when encountering with water vapor and oxygen, and the invalid portion 231 is formed on the quantum dot film. When the light emitted by the light source passes through the invalid portion 231 of the quantum dot film, it is impossible to generate the light in a corresponding color, so the light emitted by the light source maintains its original color and exits from the display module.

When the orthogonal projection of the invalid portion 231 onto the light guide plate 20 is arranged within the orthogonal projection of the middle frame 21 onto the light guide plate 20, it is able to ensure that an overlapping region of the color conversion film layer 23 with the display region of the display panel 30 is excited normally, thereby to ensure the luminous efficiency of the display module.

In the embodiments of the present disclosure, the display module further includes a middle frame 21, the middle frame 21 includes a first portion arranged at the lateral surface of the light guide plate 20 and a second portion covering at least a part of the edge of the first surface of the light guide plate 20; and the light guide plate 20 is provided with a target boundary at a side where the at least a part of the edge is located, and a width of the at least a part of the edge is less than or equal to 10 mm in a direction parallel to the light guide plate 20 and perpendicular to the target boundary. When the width of the at least a part of the edge is less than or equal to 10 mm, it is able to reduce a width of the frame of the display module and improve user experience.

As shown in FIGS. 1, 2 and 4 to 7, in the embodiments of the present disclosure, the optical material layer includes a prism layer 26 and a brightness enhancement film 27, and the prism layer 26 is arranged between the color conversion film layer 23 and the brightness enhancement film 27; and at the non-film-fixed side, an orthogonal projection of the prism layer 26 onto the color conversion film layer 23 and/or an orthogonal projection of the brightness enhancement film 27 onto the color conversion film layer 23 do not overlap with the invalid portion.

According to the display module in the embodiments of the present disclosure, the back plate, the electromagnetic film 28 (if exists), the reflection sheet 24, the light guide plate 20, the color conversion film layer 23, the middle frame 21, the prism layer 26, the brightness enhancement film 27 (DBEF) and the display panel 30 are laminated one on another.

In the embodiments of the present disclosure, as shown in FIGS. 1, 2 and 4 to 7, the DBEF is limited by the second portion of the middle frame 21, and there is a gap between the DBEF and the middle frame 21 in a direction parallel to the light-exiting surface of the display panel. In a possible embodiment of the present disclosure, the prism layer 26 and the DBEF are limited by the second portion of the middle frame 21, and there are gaps between the prism layer 26 and the middle frame 21 and between the DBEF and the middle frame 21 in the direction parallel to the light-exiting surface of the display panel. In this regard, it is able to reduce the overall thickness of the display module, and reduce a space for the prism layer 26 and the DBEF in the direction perpendicular to the plane where the light-exiting surface of the display panel is located, thereby to improve the reliability of the display module. In a possible embodiment of the present disclosure, in the direction perpendicular to the plane where the light-exiting surface of the display panel is located, the prism layer 26 and the DBEF are fixed by a fixation structure (such as a double-sided adhesive tape or a stopping member), so as to further improve the reliability of the display module.

In a possible embodiment of the present disclosure, the middle frame 21 surrounds at least a part of lateral surfaces of the DBEF and the prism layer 26. The DBEF is limited by the middle frame 21, and there is a thermal expansion space between the DBEF and the middle frame 21 at the non-film-fixed side 11 considering the reliability. Due to the existence of the thermal expansion space, at the non-film-fixed side 11, the light emitted by the light source is not reflected for sufficient times by the DBEF, and the color conversion film layer 23 is not excited sufficiently. In this regard, at the non-film-fixed side 11, the non-fixed portion is arranged in both the peripheral region 242 and the middle region 241. In a possible embodiment of the present disclosure, both the prism layer 26 and the DBEF are limited by the middle frame 21, and there are thermal expansion spaces between the prism layer 26 and the middle frame 21 and between the DBEF and the middle frame 21, so as to enable the light emitted by the light source to excite the color conversion film layer 23 sufficiently. In a possible embodiment of the present disclosure, at the non-film-fixed side 11, an orthogonal projection of the prism layer 26 onto the back plate 29 at least partially overlaps with an orthogonal projection of an edge of the DBEF onto the back plate 29. In a possible embodiment of the present disclosure, at the non-film-fixed side 11, the orthogonal projection of the prism layer 26 onto the back plate 29 coincides with the orthogonal projection of the edge of the DBEF onto the back plate 29.

At the non-film-fixed side 11, the orthogonal projection of the prism layer 26 onto the color conversion film layer 23 and/or the orthogonal projection of the brightness enhancement film 27 onto the color conversion film layer 23 do not overlap with the invalid region, so that an overlapping region of the color conversion film layer 23 with the prism layer 26 and an overlapping region of the color conversion film layer 23 with the brightness enhancement film 27 are non-invalid regions. In this way, it is able to ensure the reliability and the luminous efficiency of the display module.

Figure 3:
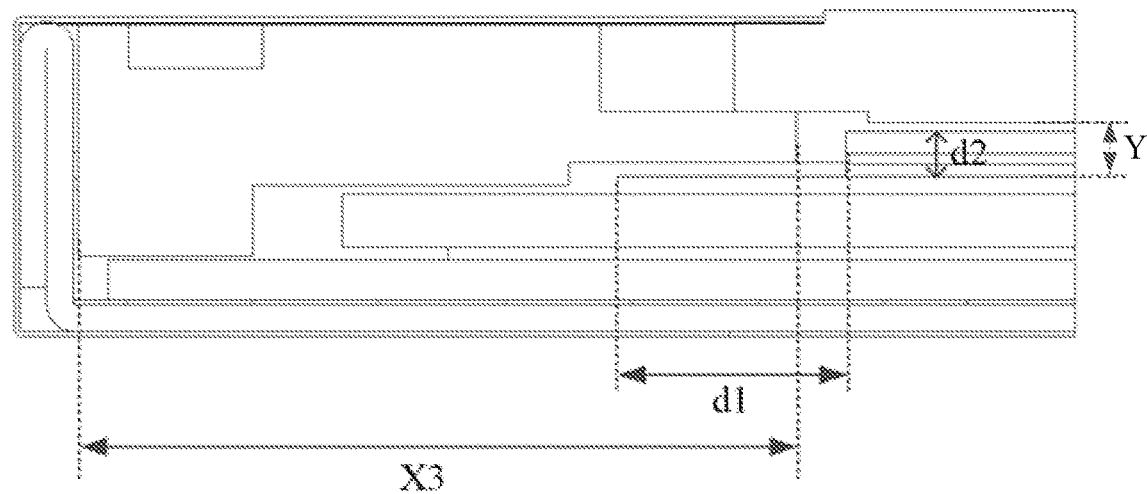
FIG. 3 is a schematic view showing the display module with a part of parameters in FIG. 2.
Figure 4:
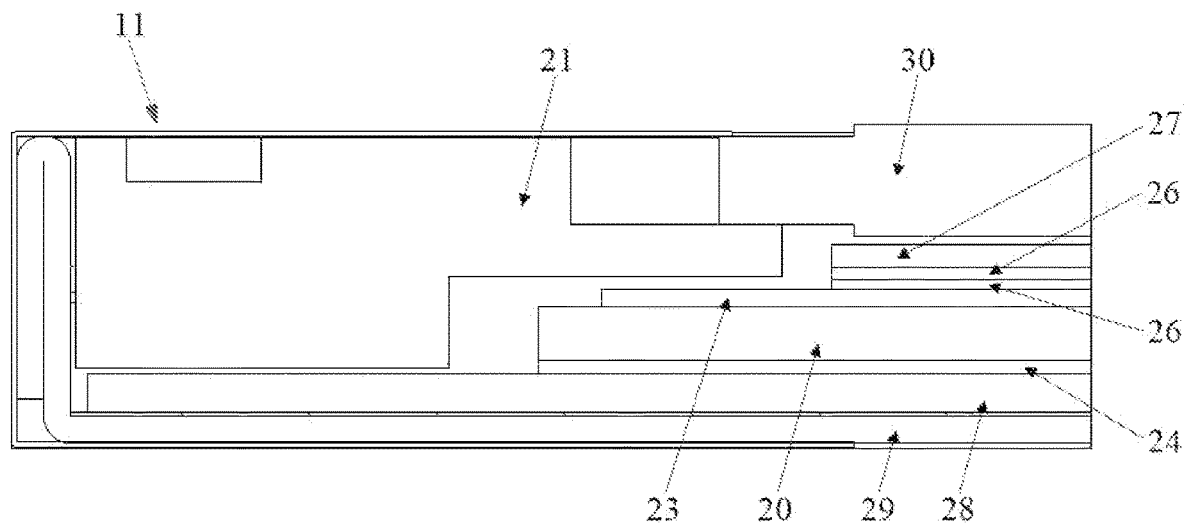
FIG. 4 is a sectional view of the display module at the non-film-fixed side adjacent to the film-fixed side according to one embodiment of the present disclosure.
Figure 5:
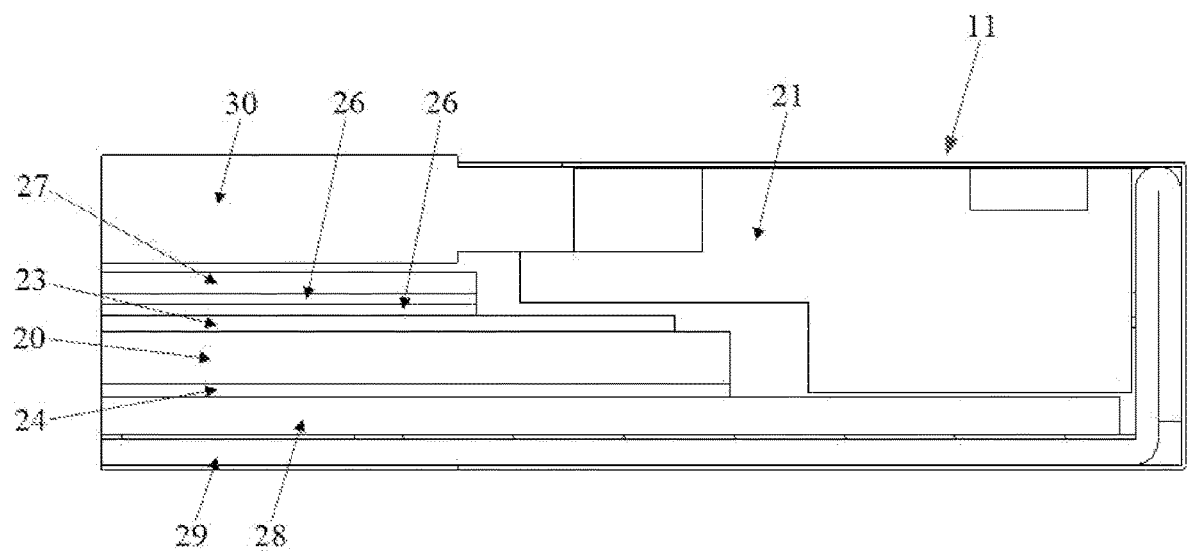
FIG. 5 is another sectional view of the display module at the non-film-fixed side adjacent to the film-fixed side according to one embodiment of the present disclosure.

As shown in FIG. 2 and FIG. 3, in the embodiments of the present disclosure, the display module further includes a middle frame 21, the middle frame 21 includes a first portion arranged at the lateral surface of the light guide plate 20 and a second portion covering at least a part of the edge of the first surface; a width X of a target portion in the fluorescent material layer 25 satisfies X=X1+X2+X3; X1 satisfies $$\frac{X1}{Y} = \frac{d1}{d2};$$

Y is a distance between the display panel 30 and the color conversion film layer 23 in a direction perpendicular to the display panel, d1 is a width of a boundary of the color conversion film layer 23 beyond a boundary of the prism layer 26 at a side where the target portion is located, and d2 is an overall thickness of the optical material layer in the direction perpendicular to the display panel; X2 satisfies $$\frac{L}{5200} \times 6;$$

L is actually measured brightness of structures in the display module other than the display panel at the side where the target portion is located; X3 is a maximum width of the middle frame at the side where the target portion is located in a direction parallel to a reflection surface of the reflection sheet, and in a direction perpendicular to the boundary of the middle region at the side where the target portion is located; and the target portion includes any one of the fixed-side portion 251, the second portion 252, the third portion 253 and the fourth portion 254.

It should be appreciated that, the above-mentioned parameters are measured in a room temperature environment, e.g., 25° C., when the display module is in a non-operating state.

For example, d2 is a sum of a thicknesses of the prism layer 26 and a thicknesses of the brightness enhancement film 27 in the direction perpendicular to the display panel.

For example, the maximum width X3 of the middle frame is less than or equal to 8 mm.

For example, when the fluorescent material layer is formed, an actual width of the target portion is X±1.5 mm, with endpoints being inclusive.

For example, the units of L and 5200 are both nit.

For example, when calculating the width of the fixed-side portion 251, d1 is a width of a boundary of the color conversion film layer 23 beyond a boundary of the prism layer 26 at a side where the fixed-side portion 251 is located. When calculating a width of the second portion 252, d1 is a width of a boundary of the color conversion film layer 23 beyond a boundary of the prism layer 26 at a side where the second portion 252 is located. When calculating a width of the third portion 253, d1 is a width of a boundary of the color conversion film layer 23 beyond a boundary of the prism layer 26 at a side where the third portion 253 is located. When calculating a width of the fourth portion 254, d1 is a width of a boundary of the color conversion film layer 23 beyond a boundary of the prism layer 26 at a side where the fourth portion 254 is located.

For example, at the film-fixed side 10, an orthogonal projection of the boundary of the prism layer 26 onto the back plate 29 in the direction perpendicular to the display panel at least partially overlaps with an orthogonal projection of a boundary of the DBEF onto the back plate 29 in the direction perpendicular to the display panel. For example, the orthogonal projection of the boundary of the prism layer 26 onto the back plate 29 in the direction perpendicular to the display panel partially overlaps with the orthogonal projection of the boundary of the DBEF onto the back plate 29 in the direction perpendicular to the display panel. For example, the orthogonal projection of the boundary of the prism layer 26 onto the back plate 29 in the direction perpendicular to the display panel coincides with the orthogonal projection of the boundary of the DBEF onto the back plate 29 in the direction perpendicular to the display panel.

For example, at the film-fixed side 10, the orthogonal projection of the boundary of the prism layer 26 and/or the orthogonal projection of the boundary of the DBEF onto the back plate 29 in the direction perpendicular to the display panel at least partially overlaps with an orthogonal projection of the boundary of the color conversion film layer 23 onto the back plate 29 in the direction perpendicular to the display panel. In this way, it is able to facilitate the fixation of the prism layer 26, the DBEF and the color conversion film layer 23 at the film-fixed side 10.

It should be appreciated that, for the above-mentioned parameter d1, a width of the expansion space is taken into consideration. The larger the expansion space, the larger the value of d1. The actually measured brightness of the structure other than the display panel in the display module is a measured brightness value when the DBEF is provided. The higher the brightness of the display module, the more the light of the light source. Hence, the higher the brightness of the display module, the larger the width of the fluorescent material layer 25. The unit of X2 is mm, and the unit of X is mm.

For example, the brightness L is measured as follows. After the formation of the optical material layer, in the case that the display panel has not been assembled yet, backlight brightness at a side of the optical material layer away from the color conversion film layer and at a side of the target portion is measured through a backlight measurement device (such as CA310), so as to obtain a value of the brightness L. When the value of L is measured at the film-fixed side, a plurality of measurement points is selected at the film-fixed side, the brightness of the measurement points are measurement through the backlight measurement device, and an average value of the brightness of the measurement points is calculated to obtain the value of L at the film-fixed side. For example, an edge of a measurement member of the backlight measurement device is aligned with the boundary of the display region, and the measurement member is configured to measure the brightness at several measurement points rather than junctions between the lateral surface in the display region.

For example, the width of the second portion 252 and the width of the fourth portion 254 in the fluorescent material layer 25 are calculated as follows. When Y is 0.61 mm, d1 is 2.55 mm and d2 is 0.51 mm, X1 is 3.05 mm; when L is 4400 nit, X2 is 5.07 mm; and when X3 is 6.4 mm, X is 14.52 mm.

For example, when the width of the fixed-side portion 251 is calculated, d1 is equal to 0, and X1 is equal to 0. In the case that the film-fixed side 10 is not provided with the middle frame, X3 is equal to 0. Hence, the X corresponding to the fixed-side portion 251 is equal to X2.

When calculating the widths of the fixed-side portion 251, the second portion 252, the third portion 253 and the fourth portion 254 as mentioned hereinabove, the width of the expansion space, the brightness of the display module and the width of the middle frame 21 are taken into consideration, so it is able to improve the uniformity of the color temperature of the display module. In addition, it is able to prevent the occurrence of a yellowish phenomenon around the display module when the width of the fluorescent material layer 25 is too large.

In the embodiments of the present disclosure, in the direction parallel to the reflection surface of the reflection sheet, the maximum width of the middle frame is less than or equal to 8 mm in the direction perpendicular to the boundary of the middle region at the side where the target portion is located.

In the embodiments of the present disclosure, the middle frame includes a first portion arranged at the lateral surface of the light guide plate and a second portion covering at least a part of the edge of the first surface.

The light guide plate is provided with a target boundary at a side where the at least a part of the edge is located, and a width of the at least a part of the edge is less than or equal to 10 mm in a direction parallel to the light guide plate and perpendicular to the target boundary. The width of the at least a part of the edge is less than or equal to 10 mm, so as to reduce the width of the frame of the display module and improve the user experience.

As shown in FIG. 6 and FIG. 7, in the embodiments of the present disclosure, in the middle region 241, the minimum width of the third portion 253 is less than or equal to 4 mm, and the minimum width of the second portion 252 and/or the minimum width of the fourth portion 254 are less than or equal to 9 mm.

In the middle region 241, in a direction parallel to the reflection sheet 24, the minimum width of the third portion 253 is less than or equal to 4 mm in a direction perpendicular to the boundary of the reflection sheet 24 at a same side as the third portion 253; the minimum width of the second portion 252 is less than or equal to 9 mm in a direction perpendicular to the boundary of the reflection sheet 24 at a same side as the second portion 252; and the minimum width of the fourth portion 254 is less than or equal to 9 mm in a direction perpendicular to the boundary of the reflection sheet 24 at a same side as the fourth portion 254.

Based on the above, it is able for the fluorescent material layer 25 to adaptively compensate for the color temperature at each side of the display module, thereby to improve the uniformity of the color temperature of the display module.

As shown in FIG. 6, in the embodiments of the present disclosure, the lamp strip 22 is arranged at the film-fixed side 10.

For example, the lamp strip 22 is also arranged at the non-film-fixed side 11.

When the lamp strip 22 is arranged at the film-fixed side 10, it is able to reduce the width of the display module at the non-film-fixed side 11, thereby to provide the display module with a narrow frame.

In the embodiments of the present disclosure, the lamp strip 22 includes a lamp strip for emitting blue light, the fluorescent material layer 25 includes a yellow fluorescent material layer 25, and the color conversion film layer 23 includes a red/green quantum dot film.

For example, the lamp strip 22 includes a plurality of blue LEDs.

For example, the red/green quantum dot film includes scattering particles, e.g., inorganic spheres such as silicon dioxide, so as to scatter the light.

When the lamp strip emits blue light and the fluorescent material layer 25 includes the yellow fluorescent material layer 25, the yellow fluorescent material layer 25 is excited by the blue light from the lamp strip 22, so as to generate the white light.

A luminous principle of a quantum dot film will be described as follows. Carriers in the quantum dot material receive external energy and enter an excited state, and when the carriers return to a ground state, energy is released in the form of light. Different quantum dot materials emit light at different wavelengths after being excited by the external light. When a red quantum dot material is excited by the blue light from a blue light source, red light is generated; and when a green quantum dot material is excited by the blue light from the blue light source, green light is generated.

The following description will be given when the mass percentages of the ink to the fluorescent powder are 100:40, 100:35, 100:30 and 100:25.

In a Comparative Example 1, as shown in FIG. 7, a width of the fixed-side portion 251 where the fluorescent material layer is located is 10.04 mm, a width of the second portion 252 is 17.08 mm, a width of the third portion 253 is 5.13 mm, and a width of the fourth portion 254 is 17.09 mm. At this time, the excessive blue light leakage around the display module is not improved at the above-mentioned four mass percentages.

In a Comparative Example 2, as shown in FIG. 7, the width of the fixed-side portion 251 where the fluorescent material layer is located is 7.71 mm, the width of the second portion 252 is 17.80 mm, the width of the third portion 253 is 10.04 mm, and the width of the fourth portion 254 is 17.58 mm. At this time, a yellowish phenomenon occurs around the display module at the above-mentioned four mass percentages.

In a Comparative Example 3, as shown in FIG. 7, the width of the fixed-side portion 251 where the fluorescent material layer is located is 7.71 mm, the width of the second portion 252 is 16.70 mm, the width of the third portion 253 is 9.24 mm, and the width of the fourth portion 254 is 16.70 mm. At this time, the yellowish phenomenon occurs around the display module at the above-mentioned four mass percentages.

In a Comparative Example 4, as shown in FIG. 7, the width of the fixed-side portion 251 where the fluorescent material layer is located is 5.99 mm, the width of the second portion 252 is 14.45 mm, the width of the third portion 253 is 8.67 mm, and the width of the fourth portion 254 is 15.44 mm. At this time, the blue light leakage around the display module is improved when the mass percentage of the ink to the fluorescent powder is 100:25.

The present disclosure further provides in some embodiments a display module, which includes a non-film-fixed side, and further includes: a light source, and a compensation structure, a color conversion film layer, an optical material layer and a display panel laminated one on another. Light emitted by the light source passes through the color conversion film layer and the optical material layer into the display panel; and the compensation structure includes a middle region and a peripheral region surrounding the middle region at a side facing the color conversion film layer, an orthogonal projection of the middle region onto a plane where a light-exiting surface of the display panel is located coincides with a display region of the display panel, an orthogonal projection of the peripheral region onto the plane where the light-exiting surface of the display panel is located at least partially overlaps with a non-display region of the display panel, the peripheral region is provided with a fluorescent material layer for absorbing light emitted by the light source and generating target light; at least a part of the fluorescent material layer extends to the middle region; and at the non-film-fixed side, a first distance is provided between an orthogonal projection of a boundary of the optical material layer onto a plane where the display panel is located and an orthogonal projection of a boundary of the display region close to the boundary of the optical material layer onto the plane; in a direction parallel to the plane, the fluorescent material layer is provided with a first width in a direction perpendicular to a boundary of the middle region adjacent to the fluorescent material layer; and the first width is negatively correlated with the first distance.

For example, when the first distance is measured, an extension direction of a measured first line segment (i.e., a line segment corresponding to the first distance) is perpendicular to the boundary of the display region. When the first width is measured, an orthogonal projection of a measured second line segment (i.e., a line segment corresponding to the first width) onto the plane where the display panel is located at least partially overlaps with the measured first line segment.

When the boundary of the display panel and the corresponding boundary of the middle region are curved lines, each of the direction perpendicular to the boundary of the display region and the direction perpendicular to the boundary of the middle region refers to an extension direction of a tangent line perpendicular to the curved line.

For example, the first width is inversely proportional to the first distance.

Based on the structure of the display module in the embodiments of the present disclosure, the peripheral region of the compensation structure is provided with the fluorescent material layer 25 for absorbing the light emitted by the light source and generating the target light. As a result, it is able to improve the utilization of the light emitted by the light source in the peripheral region, prevent the occurrence of a display defect at a periphery of the liquid crystal display when the light at a periphery of the display module is in a color approaching to the color of the light emitted by the light source, and provide the back light of the entire display module with a more uniform color temperature, thereby to improve a visual effect.

According to the display module in the embodiments of the present disclosure, the at least a part of the fluorescent material layer 25 extends to the middle region, so it is able to improve the utilization of the light emitted by the light source at the edge of the middle region, thereby to further prevent the occurrence of the display defect at the periphery of the liquid crystal display when the light at the periphery of the display module is in a color approaching to the color of the light emitted by the light source.

According to the display module in the embodiments of the present disclosure, at the non-film-fixed side, the first distance is provided between the orthogonal projection of the boundary of the optical material layer onto the plane where the display panel is located and the orthogonal projection of the boundary of the display region close to the boundary of the optical material layer onto the plane; in the direction parallel to the plane, the fluorescent material layer is provided with the first width in the direction perpendicular to the boundary of the middle region adjacent to the fluorescent material layer; and the first width is negatively correlated with the first distance. As a result, it is able to provide the entire display module with a more uniform color temperature, thereby to improve the visual effect.

It should be appreciated that, in the embodiments of the present disclosure, at a junction between two sides of the display module, the fluorescent material layer may be converged, so it is difficult to determine the first distance and the first width at the junction. In this regard, it is unnecessary to measure the first distance and the first width at the junction.

In the embodiments of the present disclosure, the display module further includes a film-fixed side, and the optical material layer is fixed on the film-fixed side. In a direction parallel to the display panel, a minimum width of the fluorescent material layer at the film-fixed side in a direction perpendicular to the boundary of the middle region adjacent to the fluorescent material layer is less than a minimum width of the fluorescent material layer at the non-film-fixed side in a direction perpendicular to the boundary of the middle region adjacent to the fluorescent material layer.

There is no expansion space between the optical material layer and the middle frame 21 at the film-fixed side 10, so the light emitted by the light source is reflected for many times at the film-fixed side 10, and the color conversion film layer 23 is excited for many times. As a result, a degree of polarization of the display module at the film-fixed side 10 is less than a degree of polarization of the display module at the non-film-fixed side 11. According to display the module in the embodiments of the present disclosure, in a direction parallel to the display panel, a width of the fluorescent material layer at the film-fixed side in a direction perpendicular to a boundary of the middle region adjacent to the fluorescent material layer is the smallest, so it is able to provide the entire display module with a more uniform color temperature, thereby to improve the visual effect.

In the embodiments of the present disclosure, the light source includes a light guide plate and a lamp strip, the light guide plate includes a first surface and a second surface arranged opposite to each other and a lateral surface arranged between the first surface and the second surface; the lamp strip is arranged at the lateral surface of the light guide plate, and light emitted by the lamp strip enters the light guide plate from the lateral surface of the light guide plate; the color conversion film layer is arranged at the first surface of the light guide plate, and the optical material layer is arranged at a side of the color conversion film layer away from the light guide plate; and the compensation structure includes a reflection sheet arranged at the second surface of the light guide plate, and a peripheral region of the reflection sheet is provided with the fluorescent material layer.

In the embodiments of the present disclosure, the light source includes a lamp plate, the lamp plate is arranged at a side of the color conversion film layer away from the optical material layer, and the lamp plate is reused as the compensation structure.

In the embodiments of the present disclosure, the fluorescent material layer includes a mixed material layer of ink and fluorescent powder, and a mass percentage of the ink to the fluorescent powder ranges from 100/40.5 to 100/24.5.

In the embodiments of the present disclosure, a thickness of the fluorescent material layer in a direction perpendicular to the color conversion film layer ranges from 5 μm to 6 μm.

In the embodiments of the present disclosure, the display module further includes a film-fixed side, and the optical material layer is fixed on the film-fixed side; and the fluorescent material layer includes a fixed-side portion arranged at the film-fixed side and merely arranged in the peripheral region.

In the embodiments of the present disclosure, the fluorescent material layer includes a non-fixed-side portion arranged at the non-film-fixed side and arranged in the peripheral region and the middle region.

In the embodiments of the present disclosure, the display region is of a rectangular shape, and a contour of each of the first surface and the second surface of the light guide plate is of a rectangular shape; the light guide plate includes a first lateral surface, a second lateral surface, a third lateral surface and a fourth lateral surface connected in an end-to-end manner, the first lateral surface is arranged at the film-fixed side, and the second lateral surface, the third lateral surface and the fourth lateral surface are arranged at the non-film-fixed side; and the non-fixed-side portion includes a second portion, a third portion and a fourth portion, the second portion is arranged close to the second lateral surface, the third portion is arranged close to the third lateral surface, and the fourth portion is arranged close to the fourth lateral surface.

In the embodiments of the present disclosure, the display region is of a rectangular shape other than a square shape, the display region includes a long boundary and a short boundary, the film-fixed side is arranged at a same side as the long boundary, and in the middle region, a minimum width of the second portion is greater than a minimum width of the third portion; and a minimum width of the fourth portion is greater than a minimum width of the third portion.

In the embodiments of the present disclosure, a layout density of the fluorescent material layer decreases gradually in a direction from the peripheral region to the middle region.

In the embodiments of the present disclosure, the fixed-side portion includes a first layout region and a second layout region; a layout density m1 of the fixed-side portion in the first layout region is greater than or equal to 80%, and a layout density m2 of the fixed-side portion in the second layout region is greater than or equal to 30% and less than or equal to 50%; and a boundary of the second layout region close to the middle region coincides with the boundary of the middle region, the second layout region is arranged between the middle region and the first layout region, and a boundary of the second layout region away from the middle region coincides with a boundary of the first layout region close to the middle region.

In the embodiments of the present disclosure, the third portion includes a third layout region, a fourth layout region and a fifth layout region arranged in sequence; a layout density m3 of the third portion in the third layout region is greater than or equal to 80%, a layout density m4 of the third portion in the fourth layout region is greater than or equal to 30% and less than or equal to 50%, and a layout density m5 of the third portion in the fifth layout region is greater than or equal to 15% and less than or equal to 25%; a minimum distance d1 between an orthogonal projection of a boundary of the third layout region away from the middle region onto the light guide plate and a light guide boundary of the light guide plate arranged at a same side as the third layout region is less than or equal to 1.5 mm; a minimum distance d2 between an orthogonal projection of a boundary of the fourth layout region away from the middle region onto the light guide plate and the light guide boundary is greater than 1.5 mm and less than or equal to 5 mm; and a minimum distance d3 between an orthogonal projection of a boundary of the fifth layout region away from the middle region onto the light guide plate and the light guide boundary is greater than 5 mm and less than or equal to 9 mm.

In the embodiments of the present disclosure, the second portion includes a sixth layout region, a seventh layout region, an eighth layout region and a ninth layout region arranged in sequence; a layout density m6 of the second portion in the sixth layout region is greater than or equal to 80%, a layout density m7 of the second portion in the seventh layout region is greater than or equal to 30% and less than or equal to 50%, a layout density m8 of the second portion in the eighth layout region is greater than or equal to 15% and less than or equal to 25%, and a layout density m9 of the second portion in the ninth layout region is greater than or equal to 5% and less than or equal to 15%; a minimum distance d4 between an orthogonal projection of a boundary of the sixth layout region away from the middle region onto the light guide plate and a light guide boundary of the light guide plate arranged at a same side as the sixth layout region is less than or equal to 1.5 mm; a minimum distance d5 between an orthogonal projection of a boundary of the seventh layout region away from the middle region onto the light guide plate and the light guide boundary is greater than 1.5 mm and less than or equal to 5 mm; a minimum distance d6 between an orthogonal projection of a boundary of the eighth layout region away from the middle region onto the light guide plate and the light guide boundary is greater than 5 mm and less than or equal to 9 mm; a minimum distance d7 between an orthogonal projection of a boundary of the ninth layout region away from the middle region onto the light guide plate and the light guide boundary is greater than 9 mm and less than or equal to 11 mm; and the fourth portion is arranged in a same layout manner as the second portion.

In the embodiments of the present disclosure, the display module further includes a middle frame arranged at least around the non-film-fixed side; the middle frame covers a part of an edge of the light guide plate; the color conversion film layer includes an invalid portion, and at the non-film-fixed side, an orthogonal projection of the invalid portion onto the light guide plate is arranged within an orthogonal projection of the middle frame onto the light guide plate; the optical material layer includes a prism layer and a brightness enhancement film, and the prism layer is arranged between the color conversion film layer and the brightness enhancement film; and at the non-film-fixed side, an orthogonal projection of the prism layer onto the color conversion film layer and/or an orthogonal projection of the brightness enhancement film onto the color conversion film layer do not overlap with the invalid portion.

In the embodiments of the present disclosure, the display module further includes a middle frame, the middle frame includes a first portion arranged at the lateral surface of the light guide plate and a second portion covering at least a part of the edge of the first surface; a width X of a target portion in the fluorescent material layer satisfies X=X1+X2+X3; X1 satisfies $$\frac{X1}{Y} = \frac{d1}{d2};$$

Y is a distance between the display panel and the color conversion film layer in a direction perpendicular to the display panel, d1 is a width of a boundary of the color conversion film layer beyond a boundary of the prism layer at a side where the target portion is located, and d2 is an overall thickness of the optical material layer in the direction perpendicular to the display panel; X2 satisfies $$\frac{L}{5200} \times 6;$$

L is actually measured brightness of structures in the display module other than the display panel at the side where the target portion is located; X3 is a maximum width of the middle frame at the side where the target portion is located, in a direction parallel to a reflection surface of the reflection sheet, and in a direction perpendicular to the boundary of the middle region at the side where the target portion is located; and the target portion includes any one of the fixed-side portion, the second portion, the third portion and the fourth portion.

In the embodiments of the present disclosure, in the direction parallel to the reflection surface of the reflection sheet, the maximum width of the middle frame is less than or equal to 8 mm in the direction perpendicular to the boundary of the middle region at the side where the target portion is located.

In the embodiments of the present disclosure, the middle frame includes a first portion arranged at the lateral surface of the light guide plate and a second portion covering at least a part of the edge of the first surface.

In the embodiments of the present disclosure, the light guide plate is provided with a target boundary at a side where the at least a part of the edge is located, and a width of the at least a part of the edge is less than or equal to 10 mm in a direction parallel to the light guide plate and perpendicular to the target boundary.

In the embodiments of the present disclosure, in the middle region, the minimum width of the third portion is less than or equal to 4 mm, and the minimum width of the second portion and/or the minimum width of the fourth portion are less than or equal to 9 mm.

In the embodiments of the present disclosure, the lamp strip is arranged at the film-fixed side.

In the embodiments of the present disclosure, the lamp strip includes a lamp strip for emitting blue light, the fluorescent material layer includes a yellow fluorescent material layer, and the color conversion film layer includes a red/green quantum dot film.

The present disclosure further provides in some embodiments a display device, which includes the above-mentioned display module.

According to the display module in the embodiments of the present disclosure, the peripheral region of the compensation structure is provided with the fluorescent material layer 25 for absorbing the light emitted by the light source and generating the target light. As a result, it is able to improve the utilization of the light emitted by the light source in the peripheral region, prevent the occurrence of a display defect at a periphery of the liquid crystal display when the light at a periphery of the display module is in a color approaching to the color of the light emitted by the light source, and provide the back light of the entire display module with a more uniform color temperature, thereby to improve a visual effect.

According to the display module in the embodiments of the present disclosure, the at least a part of the fluorescent material layer 25 extends to the middle region, so it is able to improve the utilization of the light emitted by the light source at the edge of the middle region, thereby to further prevent the occurrence of the display defect at the periphery of the liquid crystal display when the light at the periphery of the display module is in a color approaching to the color of the light emitted by the light source.

When the display device includes the above-mentioned display module, it is able to achieve a same beneficial effect, which will not be particularly defined herein.

It should be appreciated that, in the embodiments of the present disclosure, the rectangular shape may be a right-angled rectangular shape or a rounded rectangular shape, or a part of vertices of the rectangular shape are rounded. The right-angled rectangular shape is a regular rectangular shape, and all sides of the rectangular shape are straight lines.

It should be further appreciated that, the display device may be any product or member having a display function, such as a television, a display, a digital photo frame, a mobile phone and a tablet computer. The display device further includes a flexible circuit board, a printed circuit board and a back plate.

In the embodiments of the present disclosure, the order of the steps is not limited to the serial numbers thereof. For a person skilled in the art, any change in the order of the steps shall also fall within the scope of the present disclosure if without any creative effort.

It should be further appreciated that, the above embodiments have been described in a progressive manner, and the same or similar contents in the embodiments have not been repeated, i.e., each embodiment has merely focused on the difference from the others. Especially, the method embodiments are substantially similar to the product embodiments, and thus have been described in a simple manner.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "include" or "including" intends to indicate that an element or object before the word contains an element or object or equivalents thereof listed after the word, without excluding any other element or object. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

It should be appreciated that, in the case that such an element as layer, film, region or substrate is arranged "on" or "under" another element, it may be directly arranged "on" or "under" the other element, or an intermediate element may be arranged therebetween.

In the above description, the features, structures, materials or characteristics may be combined in any embodiment or embodiments in an appropriate manner.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A display module, comprising a film-fixed side and a non-film-fixed side, and further comprising a light source, and a compensation structure, a color conversion film layer, an optical material layer and a display panel laminated one on another;
   wherein light emitted by the light source passes through the color conversion film layer and the optical material layer into the display panel;
   the optical material layer is fixed on the film-fixed side; and
   the compensation structure comprises a middle region and a peripheral region surrounding the middle region at a side facing the color conversion film layer, an orthogonal projection of the middle region onto a plane where a light-exiting surface of the display panel is located coincides with a display region of the display panel, an orthogonal projection of the peripheral region onto the plane where the light-exiting surface of the display panel is located at least partially overlaps with a non-display region of the display panel, the peripheral region is provided with a fluorescent material layer for absorbing light emitted by the light source and generating target light, at least a part of the fluorescent material layer extends to the middle region, and in a direction parallel to the display panel, a minimum width of the fluorescent material layer at the film-fixed side in a direction perpendicular to a boundary of the middle region adjacent to the fluorescent material layer is less than a minimum width of the fluorescent material layer at the non-film-fixed side in a direction perpendicular to the boundary of the middle region adjacent to the fluorescent material layer, wherein the light source comprises a light guide plate and a lamp strip, the light guide plate comprises a first surface and a second surface arranged opposite to each other and a lateral surface arranged between the first surface and the second surface, the lamp strip is arranged at the lateral surface of the light guide plate, and light emitted by the lamp strip enters the light guide plate from the lateral surface of the light guide plate; the color conversion film layer is arranged at the first surface of the light guide plate, and the optical material layer is arranged at a side of the color conversion film layer away from the light guide plate; and the compensation structure comprises a reflection sheet arranged at the second surface of the light guide plate, and a peripheral region of the reflection sheet is provided with the fluorescent material layer, wherein the fluorescent material layer comprises a fixed-side portion arranged at the film-fixed side and merely arranged in the peripheral region, wherein the fluorescent material layer comprises a non-fixed-side portion arranged at the non-film-fixed side and arranged in both the peripheral region and the middle region, wherein the display region is of a rectangular shape, and a contour of each of the first surface and the second surface of the light guide plate is of a rectangular shape; the light guide plate comprises a first lateral surface, a second lateral surface, a third lateral surface and a fourth lateral surface connected in an end-to-end manner, the first lateral surface is arranged at the film-fixed side, and the second lateral surface, the third lateral surface and the fourth lateral surface are arranged at the non-film-fixed side; and the non-fixed-side portion comprises a second portion, a third portion and a fourth portion, the second portion is arranged close to the second lateral surface, the third portion is arranged close to the third lateral surface, and the fourth portion is arranged close to the fourth lateral surface, and wherein the display module further comprises a middle frame arranged at least around the non-film-fixed side, the middle frame covers a part of an edge of the light guide plate; and the color conversion film layer comprises an invalid portion, and at the non-film-fixed side, an orthogonal projection of the invalid portion onto the light guide plate is arranged within an orthogonal projection of the middle frame onto the light guide plate.

2. The display module according to claim 1, wherein the light source comprises a lamp plate, the lamp plate is arranged at a side of the color conversion film layer away from the optical material layer, and the lamp plate is reused as the compensation structure.

3. The display module according to claim 1, wherein the fluorescent material layer comprises a mixed material layer of ink and fluorescent powder, and a mass percentage of the ink to the fluorescent powder ranges from 100/40.5 to 100/24.5.

4. The display module according to claim 3, wherein the mass percentage of the ink to the fluorescent powder ranges from 100/25.5 to 100/24.5.

5. The display module according to claim 1, wherein the display region is of a rectangular shape other than a square shape, the display region comprises a long boundary and a short boundary, the film-fixed side is arranged at a same side as the long boundary, and in the middle region, a minimum width of the second portion is greater than a minimum width of the third portion and a minimum width of the fourth portion is greater than a minimum width of the third portion.

6. The display module according to claim 1, wherein a layout density of the fluorescent material layer decreases gradually in a direction from the peripheral region to the middle region.

7. The display module according to claim 6, wherein the fixed-side portion comprises a first layout region and a second layout region; a layout density m1 of the fixed-side portion in the first layout region is greater than or equal to 80%, and a layout density m2 of the fixed-side portion in the second layout region is greater than or equal to 30% and less than or equal to 50%; and a boundary of the second layout region close to the middle region coincides with the boundary of the middle region, the second layout region is arranged between the middle region and the first layout region, and a boundary of the second layout region away from the middle region coincides with a boundary of the first layout region close to the middle region, and/or wherein the third portion comprises a third layout region, a fourth layout region and a fifth layout region arranged in sequence; a layout density m3 of the third portion in the third layout region is greater than or equal to 80%, a layout density m4 of the third portion in the fourth layout region is greater than or equal to 30% and less than or equal to 50%, and a layout density m5 of the third portion in the fifth layout region is greater than or equal to 15% and less than or equal to 25%; a minimum distance d1 between an orthogonal projection of a boundary of the third layout region away from the middle region onto the light guide plate and a light guide boundary of the light guide plate arranged at a same side as the third layout region is less than or equal to 1.5 mm; a minimum distance d2 between an orthogonal projection of a boundary of the fourth layout region away from the middle region onto the light guide plate and the light guide boundary is greater than 1.5 mm and less than or equal to 5 mm; and a minimum distance d3 between an orthogonal projection of a boundary of the fifth layout region away from the middle region onto the light guide plate and the light guide boundary is greater than 5 mm and less than or equal to 9 mm, and/or wherein the second portion comprises a sixth layout region, a seventh layout region, an eighth layout region and a ninth layout region arranged in sequence; a layout density m6 of the second portion in the sixth layout region is greater than or equal to 80%, a layout density m7 of the second portion in the seventh layout region is greater than or equal to 30% and less than or equal to 50%, a layout density m8 of the second portion in the eighth layout region is greater than or equal to 15% and less than or equal to 25%, and a layout density m9 of the second portion in the ninth layout region is greater than or equal to 5% and less than or equal to 15%; a minimum distance d4 between an orthogonal projection of a boundary of the sixth layout region away from the middle region onto the light guide plate and a light guide boundary of the light guide plate arranged at a same side as the sixth layout region is less than or equal to 1.5 mm; a minimum distance d5 between an orthogonal projection of a boundary of the seventh layout region away from the middle region onto the light guide plate and the light guide boundary is greater than 1.5 mm and less than or equal to 5 mm; a minimum distance d6 between an orthogonal projection of a boundary of the eighth layout region away from the middle region onto the light guide plate and the light guide boundary is greater than 5 mm and less than or equal to 9 mm; a minimum distance d7 between an orthogonal projection of a boundary of the ninth layout region away from the middle region onto the light guide plate and the light guide boundary is greater than 9 mm and less than or equal to 11 mm; and a layout of the fourth portion is the same as the second portion.

8. The display module according to claim 1, wherein a minimum width of the invalid portion in a direction parallel to the light guide plate is between 1 mm and 1.5 mm, and/or wherein the optical material layer comprises a prism layer and a brightness enhancement film, and the prism layer is arranged between the color conversion film layer and the brightness enhancement film; and at the non-film-fixed side, an orthogonal projection of the prism layer onto the color conversion film layer and/or an orthogonal projection of the brightness enhancement film onto the color conversion film layer do not overlap the invalid portion.

9. The display module according to claim 1, further comprising a middle frame, wherein the middle frame comprises a first portion arranged at the lateral surface of the light guide plate and a second portion covering at least a part of an edge of the first surface; a width X of a target portion in the fluorescent material layer satisfies X=X1+X2+X3, X1 satisfies $$\frac{X1}{Y} = \frac{d1}{d2},$$

Y is a distance between the display panel and the color conversion film layer in a direction perpendicular to the display panel, d1 is a width of a boundary of the color conversion film layer beyond a boundary of the prism layer at a side where the target portion is located, d2 is an overall thickness of the optical material layer in the direction perpendicular to the display panel, X2 satisfies:

$$\frac{L}{5200} \times 6,$$

L is actually measured brightness of structures in the display module other than the display panel at the side where the target portion is located, X3 is a maximum width of the middle frame at the side where the target portion is located, in a direction parallel to a reflection surface of the reflection sheet and in a direction perpendicular to the boundary of the middle region at the side where the target portion is located; and the target portion comprises any one of the fixed-side portion, the second portion, the third portion and the fourth portion, wherein in the direction parallel to the reflection surface of the reflection sheet, X3 is less than or equal to 8 mm in the direction perpendicular to the boundary of the middle region at the side where the target portion is located, and/or wherein the light guide plate is provided with a target boundary at a side where the at least a part of the edge is located, and a width of the at least a part of the edge is less than or equal to 10 mm in a direction parallel to the light guide plate and perpendicular to the target boundary.

10. The display module according to claim 1, wherein in the middle region, the minimum width of the third portion is less than or equal to 4 mm, and the minimum width of the second portion and/or the minimum width of the fourth portion are less than or equal to 9 mm.

11. The display module according to claim 1, wherein the lamp strip is arranged at the film-fixed side, wherein the lamp strip comprises a lamp strip for emitting blue light, the fluorescent material layer comprises a yellow fluorescent material layer, and the color conversion film layer comprises a red/green quantum dot film.

12. A display device, comprising the display module according to claim 1.

13. A display module, comprising a non-film-fixed side, a light source, and a compensation structure, a color conversion film layer, an optical material layer and a display panel laminated one on another, wherein light emitted by the light source passes through the color conversion film layer and the optical material layer into the display panel; and the compensation structure comprises a middle region and a peripheral region surrounding the middle region at a side facing the color conversion film layer, an orthogonal projection of the middle region onto a plane where a light-exiting surface of the display panel is located coincides with a display region of the display panel, an orthogonal projection of the peripheral region onto the plane where the light-exiting surface of the display panel is located at least partially overlaps with a non-display region of the display panel, the peripheral region is provided with a fluorescent material layer for absorbing light emitted by the light source and generating target light;

at least a part of the fluorescent material layer extends to the middle region; and at the non-film-fixed side, a first distance is provided between an orthogonal projection of a boundary of the optical material layer onto a plane where the display panel is located and an orthogonal projection of a boundary of the display region close to the boundary of the optical material layer onto the plane;

in a direction parallel to the plane, the fluorescent material layer is provided with a first width in a direction perpendicular to a boundary of the middle region adjacent to the fluorescent material layer; and the first width is negatively correlated with the first distance.

14. The display module according to claim 13, wherein the first width is inversely proportional to the first distance.

15. The display module according to claim 13, further comprising a film-fixed side, wherein the optical material layer is fixed on the film-fixed side; and in a direction parallel to the display panel, a minimum width of the fluorescent material layer at the film-fixed side in a direction perpendicular to the boundary of the middle region adjacent to the fluorescent material layer is less than a minimum width of the fluorescent material layer at the non-film-fixed side in a direction perpendicular to the boundary of the middle region adjacent to the fluorescent material layer.

16. The display module according to claim 13, wherein the light source comprises a light guide plate and a lamp strip, the light guide plate comprises a first surface and a second surface arranged opposite to each other and a lateral surface arranged between the first surface and the second surface; the lamp strip is arranged at the lateral surface of the light guide plate, and light emitted by the lamp strip enters the light guide plate from the lateral surface of the light guide plate; the color conversion film layer is arranged at the first surface of the light guide plate, and the optical material layer is arranged at a side of the color conversion film layer away from the light guide plate; and the compensation structure comprises a reflection sheet arranged at the second surface of the light guide plate, and the peripheral region of the reflection sheet is provided with the fluorescent material layer.

* * * * *